US007860815B1

(12) United States Patent
Tangirala

(10) Patent No.: US 7,860,815 B1
(45) Date of Patent: Dec. 28, 2010

(54) COMPUTER KNOWLEDGE REPRESENTATION FORMAT, SYSTEM, METHODS, AND APPLICATIONS

(76) Inventor: Venkateswara Prasad Tangirala, 32225 Condor Dr., Union City, CA (US) 94587

( * ) Notice: Subject to any disclaimer, the term of this patent is extended or adjusted under 35 U.S.C. 154(b) by 734 days.

(21) Appl. No.: 11/703,975

(22) Filed: Feb. 7, 2007

Related U.S. Application Data

(60) Provisional application No. 60/830,554, filed on Jul. 12, 2006.

(51) Int. Cl.
*G06F 17/00* (2006.01)

(52) U.S. Cl. .................................. 706/45; 707/791

(58) Field of Classification Search ............. 706/45; 707/790, 791, 792; 704/1, 9
See application file for complete search history.

(56) References Cited

U.S. PATENT DOCUMENTS

| | | | | |
|---|---|---|---|---|
| 5,309,359 | A * | 5/1994 | Katz et al. .................. 707/102 |
| 5,404,295 | A * | 4/1995 | Katz et al. .................... 707/2 |
| 5,884,302 | A * | 3/1999 | Ho .............................. 707/3 |
| 5,897,670 | A * | 4/1999 | Nielsen ...................... 715/866 |
| 6,173,279 | B1 * | 1/2001 | Levin et al. .................... 707/5 |
| 6,243,090 | B1 * | 6/2001 | Machiraju et al. .......... 715/709 |
| 6,256,618 | B1 * | 7/2001 | Spooner et al. .............. 706/13 |
| 6,282,547 | B1 * | 8/2001 | Hirsch ...................... 707/102 |
| 6,471,521 | B1 * | 10/2002 | Dornbush et al. .......... 434/322 |
| 6,498,921 | B1 * | 12/2002 | Ho et al. ..................... 434/362 |
| 6,571,240 | B1 * | 5/2003 | Ho et al. ...................... 707/5 |
| 6,584,464 | B1 * | 6/2003 | Warthen ......................... 707/4 |
| 6,665,666 | B1 * | 12/2003 | Brown et al. ................... 707/5 |
| 6,711,585 | B1 * | 3/2004 | Copperman et al. ....... 707/104.1 |
| 7,013,308 | B1 * | 3/2006 | Tunstall-Pedoe .......... 707/104.1 |
| 7,039,625 | B2 * | 5/2006 | Kim et al. ...................... 707/1 |
| 7,140,000 | B2 * | 11/2006 | Yucel ......................... 717/104 |
| 7,389,241 | B1 * | 6/2008 | Bascom ......................... 705/1 |
| 7,428,517 | B2 * | 9/2008 | Brands et al. ................ 706/45 |
| 7,451,089 | B1 * | 11/2008 | Gupta et al. .............. 704/270.1 |
| 2002/0026435 | A1 * | 2/2002 | Wyss et al. ..................... 707/1 |
| 2003/0093276 | A1 * | 5/2003 | Miller et al. ................ 704/257 |
| 2003/0217023 | A1 * | 11/2003 | Cui et al. ..................... 706/45 |
| 2004/0220969 | A1 * | 11/2004 | Cho et al. ................. 707/104.1 |
| 2005/0086188 | A1 * | 4/2005 | Hillis et al. .................. 706/50 |
| 2005/0102612 | A1 * | 5/2005 | Allan et al. ................. 715/513 |
| 2006/0286530 | A1 * | 12/2006 | Forrest et al. .............. 434/323 |
| 2007/0055656 | A1 * | 3/2007 | Tunstall-Pedoe ............. 707/3 |
| 2010/0185566 | A1 * | 7/2010 | Schott et al. ................. 706/10 |

\* cited by examiner

*Primary Examiner*—Michael B. Holmes
*Assistant Examiner*—David H Kim
(74) *Attorney, Agent, or Firm*—Morgan Law Offices, PLC; George D. Morgan

(57) ABSTRACT

A near natural language format is used to codify knowledge (including information, programs, rules, and procedures). The codified knowledge is stored in knowledge snippet files according to a nomenclature in which each file has a name relating to a particular interrogatory and the type of the interrogatory (e.g., having a file extension of: ".what", ".how", ".where", ".which", ".when", ".who", or ".why"). The content of each of the knowledge snippet files comprises an answer to the interrogatory. Language systems and methods, including a run-time environment to process or execute the knowledge, are provided to use the knowledge so represented. The knowledge may also be presented in many different perspectives or views.

3 Claims, 11 Drawing Sheets

Figure 9:

COMPUTER KNOWLEDGE REPRESENTATION FORMAT, SYSTEM, METHODS, AND APPLICATIONS

CROSS-REFERENCE TO RELATED APPLICATIONS

This application claims priority to U.S. Provisional Patent Application Ser. No. 60/830,554, filed on Jul. 12, 2006, herein incorporated in its entirety.

TECHNICAL FIELD

This invention relates to the fields of knowledge representation, programming languages, development tools, the world-wide web, semantics, and human-machine communication.

COMPUTER PROGRAM LISTING APPENDIX

Computer program listings are provided in electronic format, as permitted under 37 CFR §1.52(e) and §1.96. The submitted compact disc contains the following files:

Creation Dt. File Size (bytes) File Name
Feb. 6, 2007 889 doGoogleSearch.how.xml
Sep. 20, 2006 7,756 GoogleSearch.wsdl
Feb. 6, 2007 7,728 queryterms-q.what.xml
Feb. 6, 2007 2,528 showwsdl.xsl
Jul. 12, 2006 1,620 Basicvegetablestock.how.xml
Oct. 8, 2006 408 Buy_the_pizza_base.how.xml
Feb. 6, 2007 827 CultureDough.how.xml
Feb. 6, 2007 2,001 MakePizzabuythebase.how.xml
Jul. 11, 2006 1,092 Make_Aspagarus_soup.how.xml
Jan. 27, 2007 2,525 Make_pizza.how.xml
Feb. 5, 2007 371 My_dinner.how.xml
Jul. 11, 2006 3,686 PanningthePizzaDough.how.xml
Jul. 11, 2006 1,434 pizzasauce.how.xml
Aug. 11, 2006 5,490 1003-html.what.xml
Jan. 28, 2007 5,162 1003.what.xml
Sep. 28, 2006 680 Address.what.xml
Jul. 13, 2006 605 Advertiserates.how.xml
Jul. 17, 2006 519 applyforaloanandline.how.xml
Jul. 13, 2006 775 applywith1003.how.xml
Aug. 13, 2006 738 Borrower_Information.what.xml
Aug. 13, 2006 564 Borrower_Name.what.xml
Aug. 9, 2006 354 ccapp.how.xml
Oct. 2, 2006 1,185 ccapp.what.xml
Sep. 28, 2006 853 country_is_USA.how.xml
Oct. 2, 2006 946 creditcardapplication.how.xml
Aug. 13, 2006 327 First_Name.what.xml
Jul. 16, 2006 945 mortgageloanprocess.how.xml
Aug. 13, 2006 322 Prefix.what.xml
Sep. 28, 2006 370 SSN.what.xml
Oct. 2, 2006 317 status.what.xml
Aug. 25, 2006 256 character.what.xml
Oct. 14, 2006 455 does_the_system_know_all_the_parts_of_the_condition_to_evaluate_it.how.xml
Sep. 10, 2006 1,037 evaluate_condition.how.xml
Jan. 26, 2007 2,024 executemoderendering.how.xml
Jan. 28, 2007 485 execute_task.how.xml
Jul. 11, 2006 517 formats.which.xml
Aug. 28, 2006 772 generatebytecodefromknatom.how.xml
Aug. 15, 2006 850 header.what.xml
Feb. 6, 2007 1,035 how.what.xml
Feb. 5, 2007 28,939 how.xsl
Aug. 8, 2006 356 if.what.xml
Jul. 11, 2006 253 k.format.default.which.xml
Jul. 11, 2006 197 k.format.what.xml
Aug. 8, 2006 375 k.what.xml
Feb. 6, 2007 1,366 kgrammar-0.1.dtd
Feb. 6, 2007 2,086 kgrammar-int-0.1.dtd
Feb. 6, 2007 7,121 kgrammar-part-0.1.dtd
Feb. 5, 2007 1,852 Knob.xml
Feb. 6, 2007 1,689 Kreator.how.xml
Feb. 6, 2007 794 Menu_options.how.xml
Jul. 11, 2006 343 mode.which.xml
Jul. 11, 2006 217 pruneDombasedondeciders.how.xml
Feb. 6, 2007 991 Save_Knatom.how.xml
Feb. 6, 2007 1,434 task.what.xml
Aug. 9, 2006 460 then.what.xml
Feb. 5, 2007 866 Traverse.how.xml
Feb. 6, 2007 781 Warn.xml
Feb. 5, 2007 900 what.what.xml
Oct. 2, 2006 5,701 what.xsl
Aug. 15, 2006 439 where.what.xml
Jul. 12, 2006 495 which.what.xml
Jul. 6, 2006 1,944 which.xsl The material on these discs is hereby incorporated by reference in its entirety.

BACKGROUND

In the past quarter century since the high level computer languages were invented, the level of complexity and manual labor required to build software has not reduced significantly. Software has automated many industries by building that software ironically in a labor intensive way. In some ways the complexity of building software and the number of skill sets required to do it have increased over the last 20 years. Raw computing power has been increasing at the rate of Moore's law but most of it is not being used to make computers easy to program and maintain.

New standards and tools are proliferating, so much that even full time experts in the software industry are having a hard time to keep up with all the disparate technologies that appear regularly. The point is that today it is not easy for non technical persons to make computers "work" for them. They have to "work" hard with many people to make computers do what they want or try to make many disparate pieces of software work together themselves. This is the case even if they just want to understand what their application does end to end or rely on potentially outdated or incomplete documentation.

This evolution led us to the main problems in software industry today which are:

Problem 1: Communication Gaps—Requirements and Code are Out of Sync

Inspite of the high level languages, rule engines, Software engineering, project management best practices and tools, the biggest root causes of problems in the software industry remain to be "poor requirements" and "poor configuration management" practices. In large enterprises today, the business side of the house thinks the IT side does not understand their problems and the IT side complains that they get poor requirements. The reality is that there are too many players and hand-offs in this chain, which is only as strong as its weakest link. Bottom line? Poor communication. (Period) No amount of current tools and best practices can completely fix this human communication problem. Anybody who has spent some time in corporate America does not need an analyst study to imagine how much money, effort, time and opportunities are being wasted due to this problem. Most of the software projects are late and do not deliver completely on the requirements.

This problem technically manifests itself as (requirements) documentation and code that are out of sync. This problem and its consequences are articulated more eloquently by many experts at http://www.literateprogramming.com/quotes_sa.html (last accessed Feb. 1, 2007—also on attached CD) This problem is further exasperated by the proliferation of tools, representation formats and standards, which means that to understand the end-to-end behavior of any particular feature in a reasonably non-trivial enterprise system, many different skill sets and tools are needed. Hence it is high time to question the status quo, revisit the basics and reshape the software development paradigm.

Problem 2: Software Interoperability (how to Make Software Additive?)

A related, but different, perspective is the question of how to make knowledge additive? How can we combine the knowledge in two human brains or two organizations and benefit from the sum? Today, this is a huge problem in enterprise Databases systems/software while usefully merging/de-duping data because of referential integrity and chronological integrity, not to speak of schema mismatch issues. Another manifestation of this problem is to get two software programs written at different times by different programmers to work together, even if they are in the same programming language. This again is a pain area in enterprises during integration of IT investments by consolidating or reusing software.

Let us assume someday we can create a 'brain automata' which 'behaves' exactly like a human brain. We know the brain stores accumulated knowledge by learning over a long period of time. Does this mean that, unless all 'brains' store the knowledge in the same 'schema' (which humans might not, depending on how, when and where they 'learned' the info), we might not be able to add up/use the knowledge? Factor in the security (permissions) and this is an interesting problem to work with because it could be worked at many planes, right from a database perspective to solve today's problems, to the human brain perspective to solve tomorrow's problems. Further research into this could even help design the 'brain automata' in the first place.

Note: While this effort does not attempt to understand how knowledge is stored in the brain, it focuses on providing tools to utilize the same constructs that humans use to communicate knowledge amongst them as opposed to a more artificial representation that is closer to machines. The inventor's thought process along these lines for the last 20 years led to this solution.

The Real Underlying Problem:

The above two problems have a commonality. The real communication challenge here is not between human and system or between system and system, but really between humans (the users, sponsors, analysts, programmers, designers, etc.). In the structured knowledge space, prior art has mostly focused on Communication between humans and computers (high level programming languages, rules engines, semantic web etc) keeping the abstraction and representation structures of the knowledge closer to systems which are not natural to humans, hence needing much translation (design and coding) by programmers, analysts etc. Since they were closer to machines and very artificial, they were designed in many different ways, leading to the interoperability problems.

Communication amongst computers (networking, Service Oriented Architectures etc). Fortunately this has evolved over the years and with standards like ASCII, TCP/IP, http, XML, today machines can talk to each other more than ever in history.

Management of the communication between humans to accomplish something (software development methodologies, project management best practices and tools which attempt to bring structure and clarity after the fact, to the raw communication after it happened, either in an iterative or waterfall fashion)

But the real difficult problem lies in not starting with a clearer, unambiguous communication between humans to begin with. While there are many tools for unstructured communication between humans such as word processors, email, web pages, there is no universally suitable structure for unambiguous and structured communication between humans.

The Art:

Examination of the following prior art, in the fields of software development, web technologies and knowledge representation from many different, almost unrelated, perspectives did not yield a satisfactory, simple solution that solves these problems holistically. A driving question was how would/should knowledge be captured and software be built in the future and which language and architecture will have the capacity to sustain over decades, over a variety of platforms such as mobile phones, computers, and other devices, in spite of the ever changing world. Hence this invention.

JAVA, C# and other object oriented programming languages require somebody skilled in object oriented programming to use it. PHP, PERL, PYTHON, SQL and other programming languages are not meant for non-technical people. They subscribe to a two part paradigm, specification documentation (requirements) AND code, which often get out of sync. Tools like Javadocs create documentation out of programs and the comments in them, but given the level at which they operate they are very technical in nature and neither help business users nor give an end to end view of the entire system (ie, all the tiers beyond the JAVA code).

Tools such as IBM Rational tool set provide for traceability from Requirements to code, but they involve committing to a vendor's tool set with a large footprint and it is still a glue of multiple tools. They do not support an open representation format which can be used to enable a seamless ocean of structured knowledge and programs.

Semantic Web initiative, OWL and RDF: Per the W3C documentation, "OWL is intended to be used when the information contained in documents needs to be processed by applications, as opposed to situations where the content only needs to be presented to humans. OWL can be used to explicitly represent the meaning of terms in vocabularies and the relationships between those terms." However the drawback again is that OWL and RDF formats are limited to the "description" kind of knowledge using the subject-predicate-object metaphor and describing process flows using that metaphor can be very cumbersome. They are also technically verbose and not easy to understand for lay persons.

Rules engines are usually tied to a proprietary tool and representation formats that a) cannot be used independent of the tool and reasoning mechanisms b) cannot seamlessly interoperate with other tools c) do not support decentralization of the rules over the web and their aggregation on demand.

Websites such Ehow.com describe How to do anything, but do not have a standard way to describe the inputs and outputs and it also cannot integrate multiple "how to's", nor interoperate with the definitions of each of the terms used in it.

Wikipedia.org is a free format description, mostly descriptive type of knowledge for humans but is not machine processable.

Natural language based systems: if a simple sentence like "Mary had a little lamb" can mean completely different things in different contexts, and smart humans can misunderstand it, human-made computers cannot understand better. That is why vast efforts over the past few decades into Artificial Intelligence, Natural Language Processing (NLP) and understanding, has not yielded the promised results in making sense out of "free form" unrestricted human communication.

Efforts such as OpenCyc and Mindpixel aimed at creating a universe of knowledge, but their drawback is that they are based on a central storage and require only one authoritative meaning for terms, whereas in the real world the same word or phrase can mean entirely different things in different contexts for different people.

Coming from a different perspective, the industry and BPM vendors are pursuing standards such as IDIF, UML, RADs, PIF, PSL, WPDL, XPDL, XLANG, BPML, BPEL4WS, which are all somewhat overlapping standards. They approach this problem strictly from a work flow automation, business process and choreography perspective but are light on the other aspects of knowledge representation. It is not a holistic solution and "the problem for the systems integrator is that it is not easy to transfer process information between design tools and/or work flow control software" based upon the different design paradigms and it again is not in a near natural language form. Efforts such as wfMC indicate the challenges in integrating the different technologies.

Dublin Core Meta-data initiative is an organization dedicated to promoting the widespread adoption of inter operable meta-data standards and developing specialized metadata vocabularies for describing resources that enable more intelligent information discovery systems." It is focused strictly on meta data (only about 15 fields) and ensuring adoption of common vocabularies and needs to be complimented and augmented by providing a common viewing mechanism to merge the core meta-data with other domain specific meta-data and process flow information.

Literate Programming requires actual code to be interleaved (mixed) with the documentation. Even though documentation is the main focus, the code and documentation are still separate entities which still does not solve the root cause. The industry has not adopted it as they should have.

The promise of Model Driven Architecture (MDA) is to allow definition of machine readable application and data models which allow long-term flexibility of implementation, integration, maintenance, testing and simulation. These models are not in a near natural language and require training the users.

Codeless platform expects an object model as its input and it is not a programming tool for non-technical users.

DITA (Darwin Information Typing Architecture from IBM) is an XML-based, end-to-end architecture for authoring, producing, and delivering technical information. While DITA is based on a generic building block of a topic-oriented information architecture, it is not for building applications.

VITAL from Apple provides a technical architecture blue print for building enterprise software. It mainly focuses on the Technical Architecture Layer of the Zachman framework which they believe can come before the Business, Systems and Product Architectures. But it does not start with the Business process, nor does it support a universal representation model.

IBMs Flowmark and U.S. Pat. No. 5,930,512 Method and apparatus for building and running work flow process models using a hypertext markup language This invention provides a computer implemented method and system for implementing a workflow process server. The limitation here is that the language is not near natural language, nor does it support democratically generated models.

UBL: UBL, the Universal Business Language, is the product of an international effort to define a royalty-free library of standard electronic XML business documents such as purchase orders and invoices. Its vision aligns with our vision, but it is not a wholistic solution.

Web Service Semantic annotation using WSDL-S provides for extensibility elements (modelReference, Schemamapping, precondition, effect and category) to tie WSDL definitions to ontologies specified in a choice of representations. While this proposes mechanisms to tie WSDLs and Ontologies, it is more of a glue and not a seamless single representation of semantics and services.

Tools such as "InfoPath: An XML Editor for Rich Business Processes" do not solve either of the problems (making software transparent in natural language-or-ability to get two pieces of software work together). i.e they still subscribes to the paradigm of "documentation AND code"

Tools such as Netspective provide for tags to declare more and code less, but they are still in a "high level programming language". Does not use near natural language, nor it provides for a universal representation format which can be linkable.

MeTaL (www.meta-language.net) is shorthand for Meta-programming Language. Meta-programming is a method to develop computer programs. It works by generating source code in a target language from a program specification in a higher level language. MetaL programs source code is based on XML. This technology still requires the users to understand the high level language for the program specification and it does not support a distributed model of knowledge representation.

U.S. Pat. No. 6,282,547 hyper-linked relational database visualization system—is oriented towards databases, but does not address not address the need to provide a universal knowledge representation format.

U.S. Pat. No. 6,256,618 Computer architecture using self-manipulating trees—is about making sense out of free unconstrained natural language and does not address the need to aggregate decentralized knowledge nor provide a universal knowledge representation format.

U.S. Pat. No. 7,140,000 Knowledge oriented programming: is not solving the problems mentioned above and is not in near natural language.

U.S. Pat. No. 7,013,308 Knowledge storage and retrieval system and method The limitations of this invention are that this is just for knowledge storage and retrieval, but cannot build applications out of it or enable process flows. It is not fully decentralized as well.

US Patent Application #20050086188, "Knowledge Web" proposes a centralized, controlled proprietary storage in a learning scenario and [37] mandates a centralized registry, of that knowledge. It is not a decentralized, open representation format, that could be used independent of the tool.

US Patent Application 20040220969 Methods for the construction and maintenance of a knowledge representation system is more focused on domain specific templates and ontologies. Is not a universal near natural language Knowledge Representation.

Patent Application 20030217023: "Method and apparatus for extracting knowledge from software code or other structured data" This is solving the problem of inferring the knowledge from existing software code. The resultant representation is a Knowledgebase. It appears like a one time reverse engineering tool, but does not indicate how it will be maintained going forward This does not solve the "documentation AND code" situation. It creates yet another knowledge base about the software that is being reverse engineered.

"End-User Programming" effort at Carnegie Mellon University is attempting simplifying existing programming languages and other work around techniques such as programming by example etc which is different than directly confronting the problem of creating a representation format for human computer/human-human communication in near-natural languages.

The present invention addresses a number of these needs.

BRIEF SUMMARY

The following aspects of the computer knowledge representation format system, methods, applications, and embodiments thereof, described and illustrated below, are intended to be exemplary and illustrative, not limiting in scope.

In one aspect, a computer format for representing knowledge in computers is provided, the format comprising
uniquely addressable, hyper-linked files, each file comprising
a file name and file contents,
an answer to an interrogatory, in a near natural human language,
a statement of the interrogatory, in a near natural human language, and hyper-links to other files.

In some embodiments, the statement of the interrogatory is in the file name.

In some embodiments, the interrogatory is of a type selected from "how," "what," "when," "where," "which," "why," and "who." In some embodiments, the type of interrogatory is identified in the file name of the file.

In some embodiments, the file includes meta-data tags. In some embodiments, the answer is tagged with meta-data. In some embodiments, the files are based on xml format.

In another aspect, a computer language system for organizing knowledge using a computer is provided, the system comprising the computer format of claim 1 and a browser for the hyper-linked files. In some embodiments, the browser aggregates the contents of the hyper-linked files and presents the result in a user defined view or format. In some embodiments, the browser includes an editor for creating and/or editing files. In some embodiments, the system further comprises an editor for creating and/or editing files.

In some embodiments, language system further comprises a run time environment. In some embodiments, the language system is connected to a server. In some embodiments, the files are on the server. In some embodiments, language system is connected to the Internet. In some embodiments, the files are on the Internet.

In another aspect, a browser for reading the files is provided, the browser combining the features of aggregating the contents of the hyper-linked files and presenting the result in a user-defined view or format.

In a related aspect, a computer language system is provided, comprising
(a) hyper-linked files having
near-natural language file names and file contents relating to an answer to a particular interrogatory,
the files being hyper-linked to further hyper-linked files, and
(b) a browser for the files in near-natural language, and
(c) a run time environment to execute the hyper-linked knowledge snippets according to the user's preferences In some embodiments, the file name comprises a statement of the interrogatory. In some embodiments, the file contents comprise an answer to the interrogatory. In some embodiments, the interrogatory is of a type selected from "how," "what," "when," "where," "which," "why," and "who." In particular embodiments, the type of interrogatory is identified in the file name of the file.

In another related aspect, a computer format for representing knowledge using computers is provided, the format comprising
uniquely addressable, hyper-linked files, each file consisting of
a file name and file contents,
an answer to a interrogatory, in a near natural human language,
a statement of the interrogatory, in a near natural human language, and hyper-links to other files.

In some embodiments, the answer includes links to executable files.

In some embodiments, the statement of the interrogatory is in the file name.

In some embodiments, the interrogatory is of a type selected from "how," "what," "when," "where," "which," "why," and "who."

In some embodiments, the type of interrogatory is identified in the file name of the file.

In yet another aspect, a computer method for organizing and processing knowledge in a computer readable, near-natural human language is provided, comprising:
(a) storing knowledge in files having
a file name and contents relating to an interrogatory and its answer in a near natural human language,
the file name comprising the interrogatory and
the file content comprising the answer to the interrogatory,
the file including hyper-links to any number of other files, and
(b) using a browser to read and aggregate the hyper-linked files and present the result in many different views,
(c) using a run time environment to process the represented knowledge
thereby organizing and processing knowledge using a computer in a computer and human readable language.

In addition to the exemplary aspects and embodiments described above, further aspects and embodiments will become apparent by reference to the drawings and by study of the following descriptions.

BRIEF DESCRIPTION OF THE DRAWINGS

Figure 9:
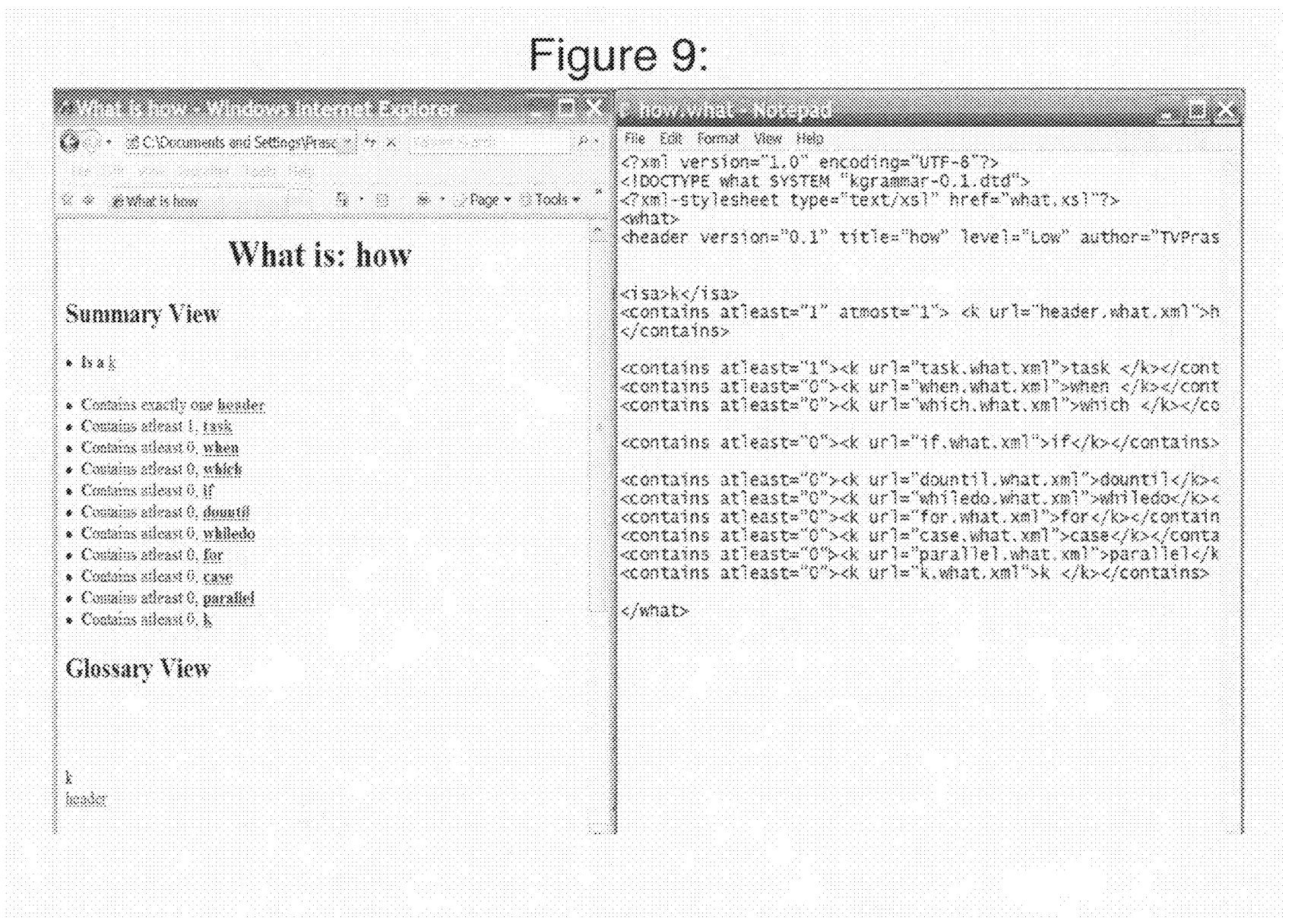

FIG. 9: "how" Knowledge Snippet defined in this representation format.

DETAILED DESCRIPTION

I. Definitions

Figure 1:
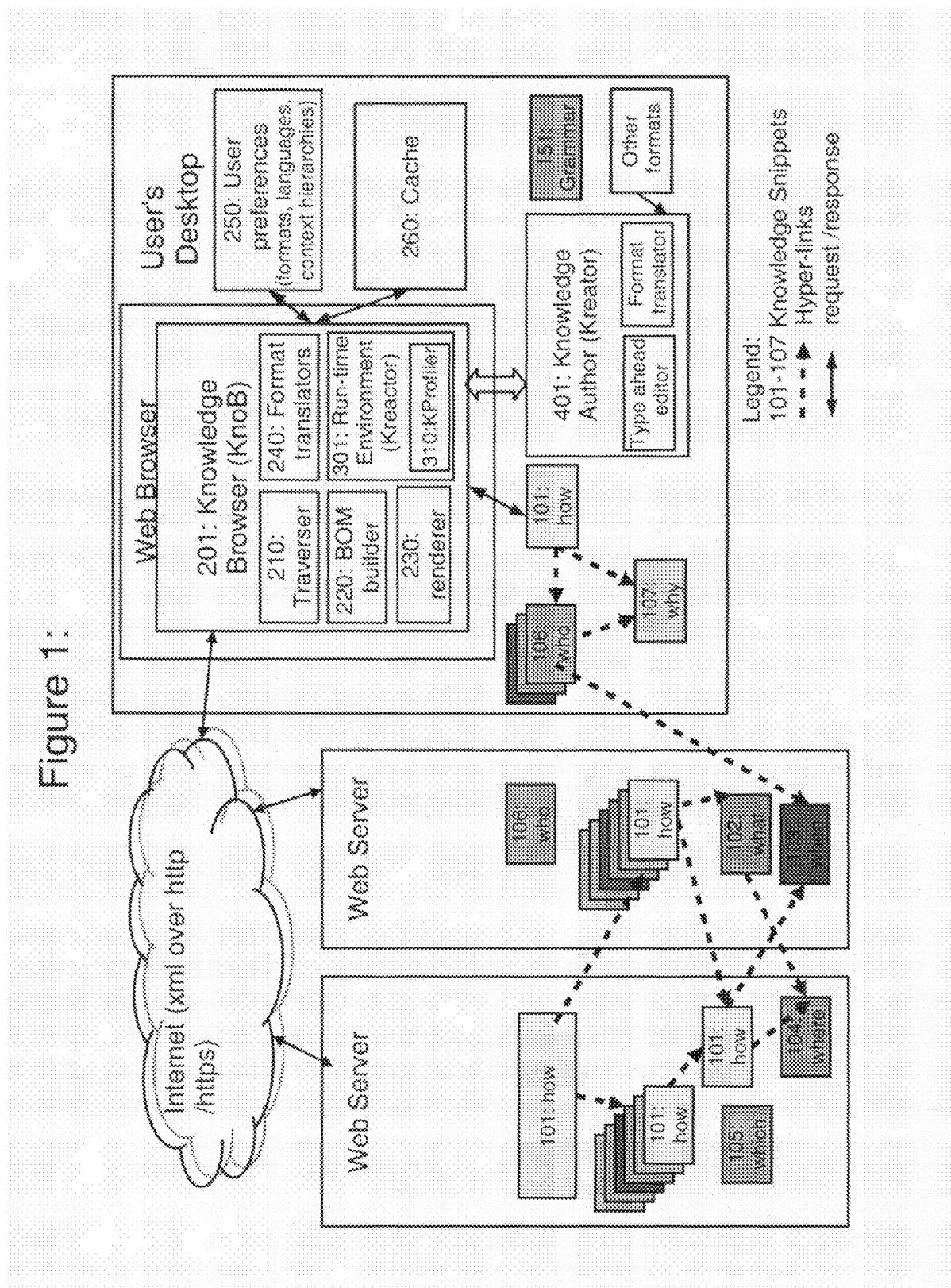
FIG. 1: A diagram depicting the Overview of the Knowledge Representation approach with supporting tools

As used herein, "near-natural human language," or similar terms, refers to a language, such as a text/written language that can be directly read and understood by humans, without special training in a computer language. The near-natural human language may utilize a limited (i.e., controlled) vocabulary or grammar; however, these features of the languages are intended to be intuitive, requiring minimal training, and allowing lay persons to quickly become facile in using the language, and to reduce the inherent ambiguity in human communications. The near-natural human language preferably uses common nouns and verbs and may support the use of Boolean or other logical linking terms. The language may be based on any known human language, including but not limited to English, Chinese, Japanese, German, French, Hindi, Spanish, Portuguese, Dutch, Icelandic, Finish, Swedish, Vietnamese, That, Greek, Russian, Polish, Telugu, etc. Translation programs may be used to convert and connect from one human language to another. The words and phrases in it could be marked up with tags to point to the meanings. However, when these tags are hidden or converted into text, the resultant sentence fragment is readable by a lay person without special training. An exemplary near-natural human language is described, herein, although similar languages may be used with the language format, language system, and methods, described.

As used herein, "Knowledge" refers to anything that is known about something and can be represented in a computer. Knowledge can be in the form of text, information, links to applications, multimedia etc. It may include definitions and explanations that a user needs to know to better understand something.

As used herein, "Interrogatory" refers to a natural language question, generally of the type What, When, Where, Which, Who, Why or How. Preferably the Interrogatory relates to just one question. Examples are: "How to make Pizza?", "What is credit card application?", "Who is Prasad?" or "Which are the options for protecting Intellectual property in the US?"

As used herein, "statement of the Interrogatory" refers to the Interrogatory defined herein expressed as a statement without the question construct. The corresponding statements for the examples given in the definition of the Interrogatory are "make Pizza", "credit card application", "Prasad" or "options for protecting Intellectual property in the US"

As used herein, "an answer to an Interrogatory" refers to a near natural language answer to an Interrogatory question as defined herein. Examples are provided in the contents of the snippet files attached herein.

As used herein, "processing knowledge" in a computer refers to the computer doing something with and/or based on the represented knowledge, including reading, aggregating, manipulating and executing the steps mentioned in the knowledge either in an interpreted or compiled mode.

As used herein, "interpreter mode" refers to processing the knowledge one step at a time as it is encountered.

As used herein, "compiled mode" refers to a two step process where all of the knowledge is first compiled in a separate phase and then the resultant "executable" is executed.

As used herein, "Knowledge browser", "browser" or "Knob" refer to the support tool for the representation format. This is distinct from a "web browser" which is referred to as such. While this is the preferred support tool to bring utility to the representation format, the format can standalone by itself to work with any other standards based tool.

As used herein "Kreator" refers to the authoring tool to help create and/or edit snippets in this representation format.

As used herein "Kreactor" refers to a supporting tool which provides for the run time environment to process the knowledge defined in this format.

As used herein "Knotion" refers to a short form of "KNOwledge funcTION" and represents a coarse grained process implemented as a logical group of knowledge snippets.

As used herein "File" unless otherwise qualified; refers to a computer file containing one snippet or meta-data about one snippet file which is distinct from other file types. When used in the context of "hyper-links to other files" the "other files" include snippet files, text files, web links, links to applications, multimedia etc.

As used herein "hyper-link", refers to a reference or navigation element in a document to another document, that automatically brings the referred information to the user when the navigation element is selected by the user or in this case automatically aggregates by the browsing system, based on user's preferences.

As used herein "Computer" refers to any device with a processing capability. This includes but is not limited to Desktops, Laptops, smart phones, special purpose devices, control systems, servers in the data center, mobile devices, PDAs etc.

As used herein "human terms" refers to the terms humans use to communicate knowledge. These include words such as What, When, Where, Which, Who, Why or How.

II. Introduction

In developing the present computer knowledge representation format system, methods, and applications, the goal was a universally suitable knowledge representation format for unambiguous, structured communication between humans and computers, to solve the current major problems of the software industry at its roots. This invention includes such a representation format and the supporting tools (i.e., a system) for allowing essentially unambiguous human to human communication and the ability to interlink those to form a seamless world wide ocean of knowledge that can be harnessed in many ways. The supporting system enables automatic transformation of that representation into many other formats or views, both human readable and machine executable.

The key is to bring the representation structure closer to humans (i.e., near-natural), to minimize translation loss and facilitate mass adoption. This is unlike the current so-called "high level language" representations which are closer to machines. Since free-form natural language technologies have many challenges, a middle ground is proposed to allow non technical users to communicate in near-natural language. The language is constrained only enough to minimize ambiguity in human-computer communication.

The present representation model will allow standardization in representing process flows, semantic data and basically all kinds of knowledge, not just by offering another new "common denominator" standard, but by bringing the standard closer to natural language with the ability to transform that information into/out of some of the existing formats.

The present invention challenges the notion that documentation and code have to be separate, which is a root cause of many problems as discussed above. It is an attempt to take the software industry in a different direction. In short, this invention lays the foundation to advance the state of the software industry from the current "documentation and code" towards "documentation is code" paradigm and towards a seamless universe of structured knowledge, parts of which can be selectively harnessed as needed by end-users.

The ultimate vision, enabled by the present invention, is to have Subject Matter Experts (SME) simply document their knowledge in a simple, universal, near-natural language which is sufficiently unambiguous for computer systems to process. "Requirements Documentation" and "code" are no longer separate entities but one and the same. The SME can view and validate knowledge while building, using a tool set that provides many different views and formats, and zooms in or out to the desired level of detail. Many views and formats are supported through plug-ins built for textual and graphical representations, such as listings, swim lanes, flow charts, UML diagrams, MIDI sequences, etc., The system, then auto-builds the application required by the user, on the fly, in an interpreter mode, or compiles for deployment. The IT staff's role is to support the infrastructure and optimize, partition, fine tune, and deploy the auto-built applications, produced from the knowledge.

III. Understanding Knowledge in Human Terms

Generally, a person or a system is considered "knowledgeable" if they can answer questions to help perform a task, preferably correctly, and in the most efficient way. From that perspective, knowing something means one or more of the following:

| | |
|---|---|
| Knowing what | (description, attributes, classification, organization, semantics, ontologies) |
| Knowing how | (steps,) |
| Knowing when | (at/before/after -absolute/relative time/concurrent) |
| Knowing where | (absolute/relative location) |
| Knowing which | (options) |
| Knowing who | (role/actual - individual/group) |
| Knowing why | (reason/explanation-application of the knowledge) |

IV. Knowledge Snippet Files

Using this reasoning, all knowledge, in any field or industry, at any level of detail, can be represented by one or more of the above seven types of interrogatories. Further, each piece of knowledge can be broken down to a basic unit (herein called a snippet of knowledge, or snippet), which is characterized by having an answer to one question which starts with one of the above question constructs. Note that in so answering the question, that snippet can and usually does refer to other snippets. Each such snippet is stored in a different file (i.e., snippet file) to ensure atomicity and re-usability. A source (to determine credibility), date, and (optionally) confidentiality, may be added. Each snippet file can be uniquely addressable on the Internet and/or an intranet.

Preferred snippet files answer one and only one interrogatory. They contain text that answers the interrogatory, which may be marked up using generic language constructs provided for in the grammar (an example is provided in the Appendix). The unanswered parts of the question are hyper-linked to other snippet files to answer interrogatories about those parts. Any part of the text may be hyper-linked to any number of other/further snippet files to further answer interrogatories, or refine the answer to an interrogatory. Text not marked up into the constructs defined in the grammar, or not hyper-linked to other snippet files, can be interpreted with human help at run time. In this manner, this invention address the free text understanding problem space with rules on dividing the natural language text into smaller snippets which are typed to an interrogatory.

The same knowledge can usually be interrogated in many ways, and each of them can be a different knowledge snippet. However they could all point to one knowledge snippet that asks the question the best way which also contains the answer. This is to avoid redundancy. However the same interrogatory can be answered differently by different persons at the same or different web sites. This results in multiple knowledge snippets with the same file name (with possibly different answers or content) but would still be uniquely addressable by their URIs. This implies that if they are on the same web site, they at least have to be in different directories. The users of the knowledge snippets will determine (possibly with the help of external support such as search engine rankings and content rating sites) which answer they would like to use and link their knowledge snippets to that answer.

A collection of such interconnected knowledge snippets would be executed in a supporting run-time tool of this invention. This way a simple grammar with a constrained (near natural) language can be both unambiguously processed by a machine as well as understood by lay men. Words or phrases in sentences are hyper-linked to their corresponding knowledge snippets and the context is based on the type of knowledge snippet. For example a word or phrase can be hyper-linked to a plurality of knowledge snippets (where it makes sense) to answer the various types of interrogatories (what, how, who, which, where, why, which) regarding that word or phrase.

The inventor also believes that before systems get deep into decision making and inferences, they should be able to follow simple instructions first, asking or confirming with users in case of any doubt.

An alternative embodiment is to categorize these interrogatories differently, where the "what", "who", "where" map to a "noun" and the "how" maps to a "verb".

This format gives complete flexibility to the user to come up with their "knowledge snippet"s for each word or phrase that they use i.e vocabulary in their knowledge snippets. The type casting of these knowledge snippets in layman understandable "question constructs or interrogatories" and their combination does the trick which is really at the heart of the innovation.

In one of the embodiments, even though there is an option of specifying a URL for each referred phrase or word, the system can automatically deduce the URL from the title of the knowledge snippet. This is proposed as a convention of concatenation of the words in the title of the knowledge snippet, or if there is no title, the phrase itself. This improves the readability of the format as most of the common words and phrases, explained locally (i.e within the authors search space) will not need a URL. That enables searching for all available types of knowledge snippets on that name to help with auto-completion in the supporting authoring tool.

Generally, the invention provides a computer representational format, computer language format and system for using and organizing knowledge; and methods for organizing and processing knowledge using the computer language format and system.

V. Features of the Invention

A. Representation Format

The computer representation format is a distributed, hyper-linked representation format that organizes knowledge in computers as snippet files, (also referred to as knowledge snippets), each of which answers only one question, e.g., a question that begins with a "how", "what", "when", "where", "which", "who" or "why" in a "near-natural language." Each snippet is stored in a file that is uniquely addressable on the internet or intranet. Snippets are hyper-linked to a plurality of further such snippets which are hereafter referred to as children of that snippet Snippet files can comprise one or more of the following tags such as, but not limited to <input>, <output>, <task>, <option>, <location>, <if>, <then>, <else>, <for>, <native-call>, <end>, <exception>, <wait>, and other user and/or domain specific tags to mark up the different parts of the narrative to help machines process the "near natural language" knowledge described therein.

these snippets have a header which contains "tagged" meta data comprising Author, represented by a who snippet, date of creation, confidentiality, reasons, context, zoom level and (transactional) atomicity.

these snippets could be encrypted with key pairs which enable the users with the right keys to provide visibility into the snippet or otherwise just allow execute permission.

these snippets could be signed with key pairs which give the users the confidence to rely that on the source of the snippet They also comprise of Deployment, preferences and UI guideline information snippets.

These files are not necessarily tied to the supporting tools mentioned herein and any open standards program can access and manipulate this representation.

Preferred Embodiment

An example of a grammar 151 (in FIG. 1 and FIG. 1A) of the preferred embodiment of this format is given in the DTD (Document Type Definition) file in the listings that are included on the attached CD.

Knowledge snippets can be one of the following types:

".how" 101: This is indicated by a file name suffix .how and is also indicated in the xml. This is mainly used to indicate how something is done i.e, a set of tasks to do something indicated by the phrase or word that is the filename prefix. The "how" snippet also comprises of looping and branching constructs which control the flow of the tasks. See FIG. 9 for a representation of what is "how", in this format.

Figure 10:
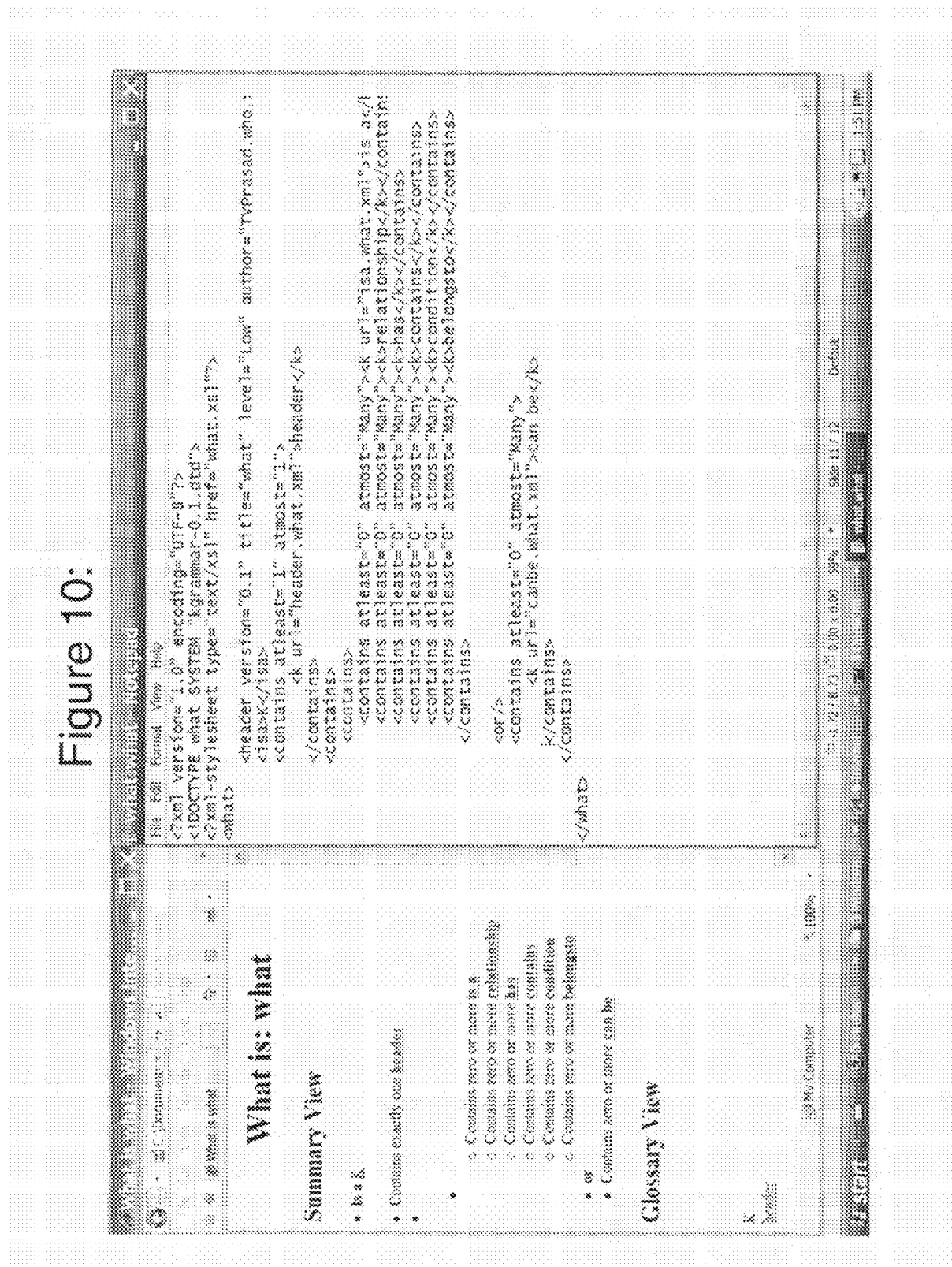
FIG. 10: "what" Knowledge Snippet defined in this representation format

".what" 102: This is indicated by a file name suffix .what and is also indicated in the xml. This is mainly used to describe the word or phrase which is the file name of the knowledge snippet. It also details any sub components of the what. For example an automobile.what "<contains>" knowledge snippets which point to its different parts such as wheels.what, engine.what etc. See FIG. 10 for a representation of what is "what" in this format.

".when" 103: This is indicated by a file name suffix .when and is also indicated in the xml. It is used to identify when the interrogatory happens in absolute or relative time or concurrently with the relative options being at/before/after.

".where" 104: This is indicated by a file name suffix .where and is also indicated in the xml. It is used to identify an absolute or relative location.

".which" 105: This is indicated by a file name suffix .which and is also indicated in the xml. It is used to identify the options available.

".who" 106: This is indicated by a file name suffix .who and is also indicated in the xml. It is used to identify a role or an actual person or a group/organization etc., and is usually a noun.

In many cases where the knowledge snippet is for a word, the ".when", ".where" and ".who" could be a special case of "what". However in this design, they are left to be open so that any phrase could have more than one of these knowledge snippets.

".why" 107: This is indicated by a file name suffix .why and is also indicated in the xml. This is reserved for the future to integrate with reasoning systems as necessary, but for now it is just a tag in the header of the other knowledge snippets and can be used to document the "why" of that knowledge snippet.

Security and privacy concerns are addressed by setting the confidentiality attribute for a knowledge snippet, and with a combination of encryption and keys the authors and deployment engineers can define who has access to the internals of the knowledge snippet vs. who can only execute the knowledge snippet vs. no access at all.

The snippets should have just one piece of knowledge and not more because it goes with best practices of modularization and granularity. The idea is to make it easy to represent things in a modular fashion to promote reuse and make it harder to write long non reusable knowledge snippets (though it can be done but they can no longer be called snippets). It also helps practice the "Once and Only Once" philosophy, which is a key to reduce many problems and inconsistencies.

Non-functional requirements can also be expressed as an answer to a what, how etc. However they might not directly result in a deployable executable. Those will become a checklist for the systems staff to ensure they partition and deploy this application in the right way to match the goals set out in the non-functional requirements.

This representation format, though based on XML as the underlying technology, is NOT using namespaces. The main design goal here was to keep it simple for both humans and machines. In that spirit, this only uses full pathnames (Uniform Resource Identifiers or URIs) to locate each knowledge snippet (as they are real and need to exist somewhere). The supporting browser (Knob) functionality comes with a feature to actually display "what" the knowledge snippet is when the user "mouse over" s the word/phrase. That is much better than having humans first locate the namespace URI from the part before the: (Colon) and then locate the document where the element is defined for example. This also eliminates the confusion of first timers regarding Namespaces not being able to be resolved to a real resource.

Figure 2:
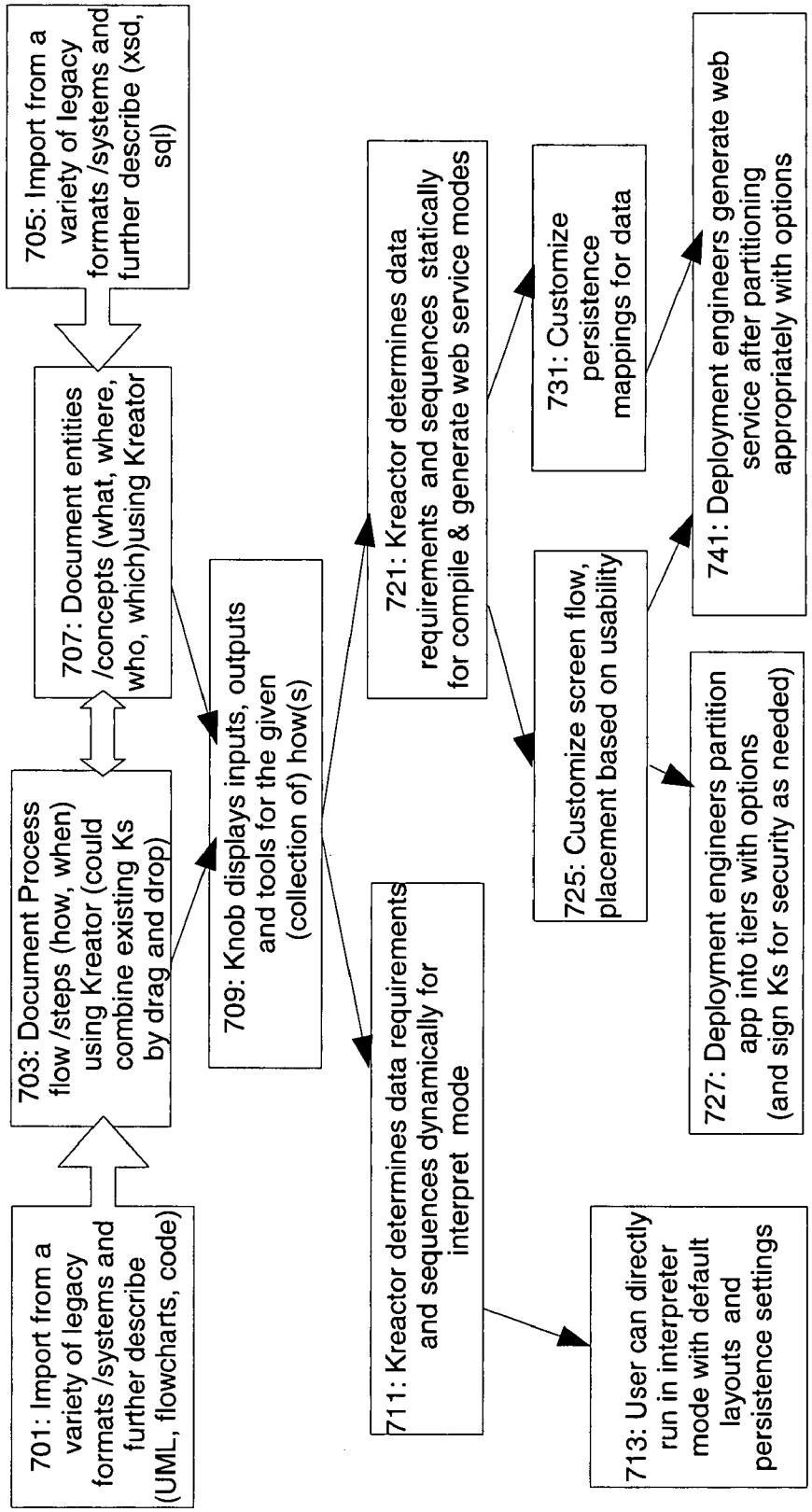
FIG. 2: A diagram depicting the new software development paradigm using this invention

This representation format is designed to be agnostic to procedural vs. object oriented approaches. Depending on where the user started looking at this knowledge from it could satisfy both the proponents of object oriented approaches as well as procedural approaches. If the knowledge is first captured more heavily in the "what"s, (right to left in the top row of FIG. 2 from 705 to 707) it follows the object oriented approach. On the other hand if the knowledge is captured more heavily starting with and focusing more on the "how"s, (left to right from 701 to 703) it can be procedural. The goal here is to look beyond any particular implementation approach that a practitioner can choose and focus on the real business problem.

While the above representation format of this invention can stand by itself and is at the core of this invention, the following set of supporting tools for this invention illustrate the utility of this representation and how the knowledge such represented can be harnessed in many different ways.

B. Knowledge Browser

1. A Knowledge Browser (hereafter referred to as Knob 201)

A Computerized Knowledge Browsing system that reads the hyper-linked knowledge snippets (that are represented in the format mentioned above) to aggregate and present to users the knowledge in a variety of user preferred formats comprising UML use cases, recipes, directions, time sequences, swim lanes, flowcharts, OWL, RDF, glossary, maps, Entity Relationship diagrams, XML schemas and other user defined formats and aggregate and detailed views at the "zoom level" desired by the users, including inputs and outputs of any level detailed views of the inputs and outputs after conversion to the user preferred unit system also indicating which snippet needed that input or produced the output User preferred languages by doing a word by word or phrase by phrase translation of the child snippets that might be in a language other than English.

This browser has multiple embodiments to operate either within the context of a web browser as a plug-in or as a standalone application on the user's desktop.

Knob 201 comprises of the following building blocks.

The Traverser 210, This helps traverse and read the knowledge snippet and its children and build a composite structure as a Document Object Model (DOM) in memory.

The BOM Builder 220: is the Bill of Material (BOM) builder which elicits the material (inputs) from the knowledge snippet and its children represented in the memory DOM.

The Format Translator 240: is an API which can support plug-ins developed to translate the knowledge snippet contents into many different formats. For example there could be a plug-in to display the information in a given knowledge snippet in UML diagrams or another plug-in to display it as a sheet of music (of course, the content has to make sense for that format, which is to be verified by the plug-in).

The Renderer 230 renders the information from the format translators according to the user's and knowledge snippet's preferences. The knowledge browsing system can convert knowledge aggregated from the traversed snippets to other user preferred representations, for example creating an aggregated shopping list from all the child ".how" recipe snippets rendered as a shopping list view. (see My_dinner example on the attached CD)

The Knob's cache 260: holds all the knowledge snippet's visited and/or aggregated by the user, subject to the size of the cache. This is held until the user explicitly deletes the contents of the cache. Details stored comprise the name, last updated time stamp, access control information, among others.

VI. Additional Features of Some Embodiments

A. Knowledge Reactor (or Kreactor 301)

Kreactor 301 is a supporting tool which provides a run time environment to process the knowledge represented in this format.

An upgraded version of the browser described above, can traverse the interconnected knowledge snippets, and a given user interface guidelines format. Then it processes the knowledge to execute a "how" snippet (along with all of its child snippets). This upgraded browser version works in one of the following three user selected modes a. "Decider" mode of the browser will enable the user walking through the selected "how" snippet and its children, enabling evaluation of the condition specified by the "if then else" constructs to list the inputs, outputs, tools, events, duration and other views for the specific scenario that is being analyzed. In example 1A, this would determine the exact ingredients to be shopped based on responses to questions such as "will the user buy or make the pizza base?" etc. Where the condition cannot be determined, views of both options will be shown.

This decider mode provides an upfront view to what is needed down stream for the entire process, by asking the key questions based on the process. This helps users understand all that is needed for a process for their situation and it also ensures that only the really required data is captured. This also ensures there is no "unclean, unnecessary data" in the system.

b. "Interpreter" mode enables the user to actually execute the process described in the how snippet and its children. Where it comes across a condition as in a "if then else" or an input, which is not "known" (assigned) to the system upto that point, it asks the user to input the same. (See example 5) This process goes on until the process reaches an end of the "how" knowledge snippet. There is a details view that is available optionally to help in debugging for advanced users and also to help in support of the application.

c. "Generate web service" mode creates a web service out of the knowledge described in the ".how" snippet and its children by consolidating all the inputs, "condition"s (information needed in if-then-else constructs) and de-duplicating the intermediate inputs and outputs that are produced within the process itself. This also includes the specific outputs produced by the "how" as the outputs of the web service. Since the "condition"s will not be known ahead in this case, the inputs and outputs are constructed for all possible outcomes of the deciders. (i.e. for example, both then and else blocks of an if)

Optionally the user can specify additional ".what"s to be included in the outputs of the web service to display the context. The so produced code can be deployed to the knowledge server or to any application server just as any normal web service would be.

Unlike the current programming languages the need for many arguments or parameter passing across these snippets is minimized because all "data" is visible to all knowledge snippets (subject to security permissions). The system automatically detects recursive calls and handles the scoping accordingly. Any ".what" knowledge snippet that does not have a quantity attribute and not specifically mapped to a persistence mechanism will be persisted in memory. Further any knowledge snippet that is persisted in memory and not specifically assigned a value will be treated as an input to the process and displayed as such. This allows the user who is defining the process to see the implication and fix it as necessary, reducing bugs.

The upgraded version of Knob caches the snippet trees it retrieves after compiling them into byte code to optimize performance. Whenever it needs to access a snippet it compares the time stamp with that on the server and will only load it over the wire if the cache is outdated. Further, this upgraded version's capability can be restricted to run in execute only mode, hiding the underlying process flow/documentation details by setting up so in the user interface guideline. An add-in component to this is the profiler which traces the timing/performance of the snippets. The output of this profiler helps the technical support staff tune the deployment of the snippet groups.

The view in the Knob is shown in the units of the user's locale/preferences, for example the weights shown in lbs in USA whereas kg in other locales. The knob can extract the inputs required and outputs produced by the snippet including its children snippets and present it as the requirements with an option to also display the intermediate inputs and outputs. For example this enables a ".how" snippet to make a pizza in English refer to a sauce recipe in Italian, which is translated word by word or phrase by phrase by the browser to unify the knowledge available in all languages. This translation is further performed by the users choice of a translation helper snippet.

The upgraded browser version further allows the user to save their preferred viewing formats and styles to always allow viewing of knowledge in their preferred formats and styles. This would mean allowing the users to create styles of display (graphics, colors, placement of visual objects and so on) and use them for specific display formats. These display styles are themselves stored as preference knowledge snippets.

The upgraded browser allows an impact analysis view of any knowledge snippet. This provides a way to a. Analyze which processes (How's), events (whens), who and locations (where) touch any given entity (what).

b. Analyze which entities (what's), events (when's), who and locations (where) are touched by a process (How).

c. Analyze which processes (Hows), entities (whats), who and locations (where) are impacted by an event (when's).

d. Analyze which processes, entities, who and events are associated with a location (where).

e. Analyze which processes, entities, locations and events are associated with a "who"

This is done basically by doing an outbound and inbound link analysis into the given knowledge snippet using the favorite search mechanism of the user and then processing that output back into the upgraded browser to display the context of each use. The domain for the inbound link analysis mentioned above can be set by the user to either just the local disk, the name space or the entire web when invoking the search as per the needs of the user.

This provides a very powerful way to analyze the role of anything in the bigger scheme of things and the impact of changing anything.

The Kreactor 301 has multiple embodiments, such as 1. deployed within the Knob 201, 2. deployed as a standalone application or 3. deployed on a knowledge server 501 on the cloud.

The proposed approach provides control over how knowledge snippets are deployed and also supports it with optimization tools to refine the "knowledge". For example decisions on where a piece of functionality (group of knowledge snippets) will be deployed (i.e in the front end or as a web service or in the persistence layer) can be made/refined at deploy time without impacting the user experience or the program logic.

Software design is not a one time activity, but is an ongoing effort as it is maintained, refactored and redeployed over the years and perhaps combined with other software in ways that were not envisioned initially. The tools and formats should make that easy and automated, by exposing the knowledge in an easy to understand format such as this. The costs of maintaining software that is not well understood by stake holders and software that is not easily extensible or does not interoperate with others are not worth the overly complex and abstract designs that might be best when they were designed but will appear to be bad decisions once some underlying assumption changes which is often the case in any software that runs over a period of time.

There might however be a need for a small class of problems and situations which need to still be coded in a high level language or assembly language. Those parts can also be wrapped by this representation format to get the best of both worlds.

Another embodiment includes a Kprofiler 310 in the Kreactor 301. Kprofiler 310 is a performance analysis tool that measures the behavior of the knowledge snippets as they run in the Kreactor 301, particularly the frequency and duration of each knowledge snippet. The output is a stream of recorded events (a trace) or a statistical summary of the events observed (a profile). The Kprofiler 310 is useful for the IT staff to help optimize the application resulting from the documented knowledge.

B. Knowledge Author (or Kreator) 401

Kreator is an authoring tool that helps in authoring and maintaining these knowledge snippets. An embodiment of this is implemented as a context sensitive editor with dynamic search and find for binding phrases or words to available knowledge snippets in the search space.

As "near natural language" knowledge is being keyed in, it helps in categorizing the type of the knowledge and automatically displays the matching knowledge snippets for each of the words or phrases that are being entered. These are displayed as drop down lists in a type ahead approach. i.e once the user enters a few characters the matching knowledge snippets are displayed so the user can select those and save the effort of typing the remaining characters. When the user selects one of those type ahead prompts, the linkages to that word are established and stored in this snippet. This enables the snippet to tie the specific meaning/definition/reference to that word or phrase in the given context. The user could still choose not to select any of the suggested "what" snippets for any or all the words and leave them ambiguous to interpretation. If the user does not tie any of the words to other snippets, this tool reduces to being just a typical word processor, which is not the intent of this invention.

This supports setting domains/contexts for presenting "what" choices for words as user preferences for a snippet. This provides a way to build upon the knowledge using nomenclature already contained in knowledge snippet repositories of a particular domain. A user configurable option also allows flagging instances where the user chose custom definitions over those that already exist in the domain.

This provides a choice of storing the knowledge snippets individually for "on-the-fly" interpretation by the Kreactor or optionally pre-compiling them into a knowledge function (called knotion) to increase performance for repetitive tasks Provides an option to list all the inputs and outputs as groups in the chronological order of their appearance in a business process transaction. The objective here is to be able to generate screens for the defined process and enable the users to change and preserve the lay outs of the screens.

Additionally, this also will have adapters for importing different formats such as wsdls, sql scripts, UML, different programming languages, etc to enable importing of knowledge in to this approach. An API enables an import wizard to work with each of the format plug-ins to import the knowledge contained in the different formats into multiple knowledge snippets (hows, whats, etc).

The number of variables/objects that a user needs to worry about should reduce using this approach because the programming is now done at a much higher level of abstraction. And then, all those reduced number of variables/objects will be exposed on the intranet/extranet/Internet as "what" knowledge snippets with their persistence bindings done during deployment. Such exposure is constrained by the confidentiality settings to ensure only those who need to know have access. The remainder of the variables/objects that are used in current programs are really the plumbing/control structures that can be abstracted and automated. Those will be required only for the technical staff involved in writing knowledge snippets at the system level.

C. Knowledge Server 501

Applicable in an enterprise situation, this resides on a server in the data center. The main function of this is to improve performance and security by storing, compiling and optimizing the knowledge snippets, maintaining a cache of hyper-linked knowledge snippets, to provide an execution environment for server side knowledge snippets and adapters to other legacy systems along with a few administration and batch jobs. This can be co-deployed with a J2EE application server. The knowledge server pre-compiles a group of snippets and/or compiles individual snippets on the fly into Java byte code and serves them to the clients as such (to increase performance and hide the "source"). This will help the Kreactor 301 above to achieve better performance as well as enable enterprises/domain specific knowledge bodies to have total control of how their knowledge is deployed.

Logical groups of knowledge snippets implement a Knotion 601 or a coarse grained process. In cases where the knowledge deployment engineers determine that those knotions are best deployed (from a performance, security and other considerations) on a central infrastructure, they can configure the deployment descriptor of the root knowledge snippet of the knotion to bind it to the physical infrastructure and to indicate to clients that it need not be downloaded to the client browser. In such cases, where the knotion is being deployed centrally, a web services (option of SOAP or REST) interface is created automatically by the deployment tool, based on the required inputs and outputs of that knotion. Optionally a WSDL file for clients to dynamically negotiate and invoke the knotion can be created at that time. This also allows legacy front ends to access this knotion using the wsdl interface. This design gives complete control of the functionality to business experts while still giving flexibility in the hands of the software professionals for the most optimal deployment.

VI. Description

Alternative Embodiment—FIGS

While the a few embodiments are shown in the examples and figures, there are many other embodiments possible. One such embodiment is to use any Verb-Noun constructs (Verb for "how" knowledge snippet and Noun for "what", "who" and "where" knowledge snippets) to represent knowledge.

The significant benefit of this invention is that many different embodiments of knowledge can be instantly derived by mixing and matching any components represented in this format and partitioning the knowledge snippets at deploy time to suit the specific need.

Figure 1A:
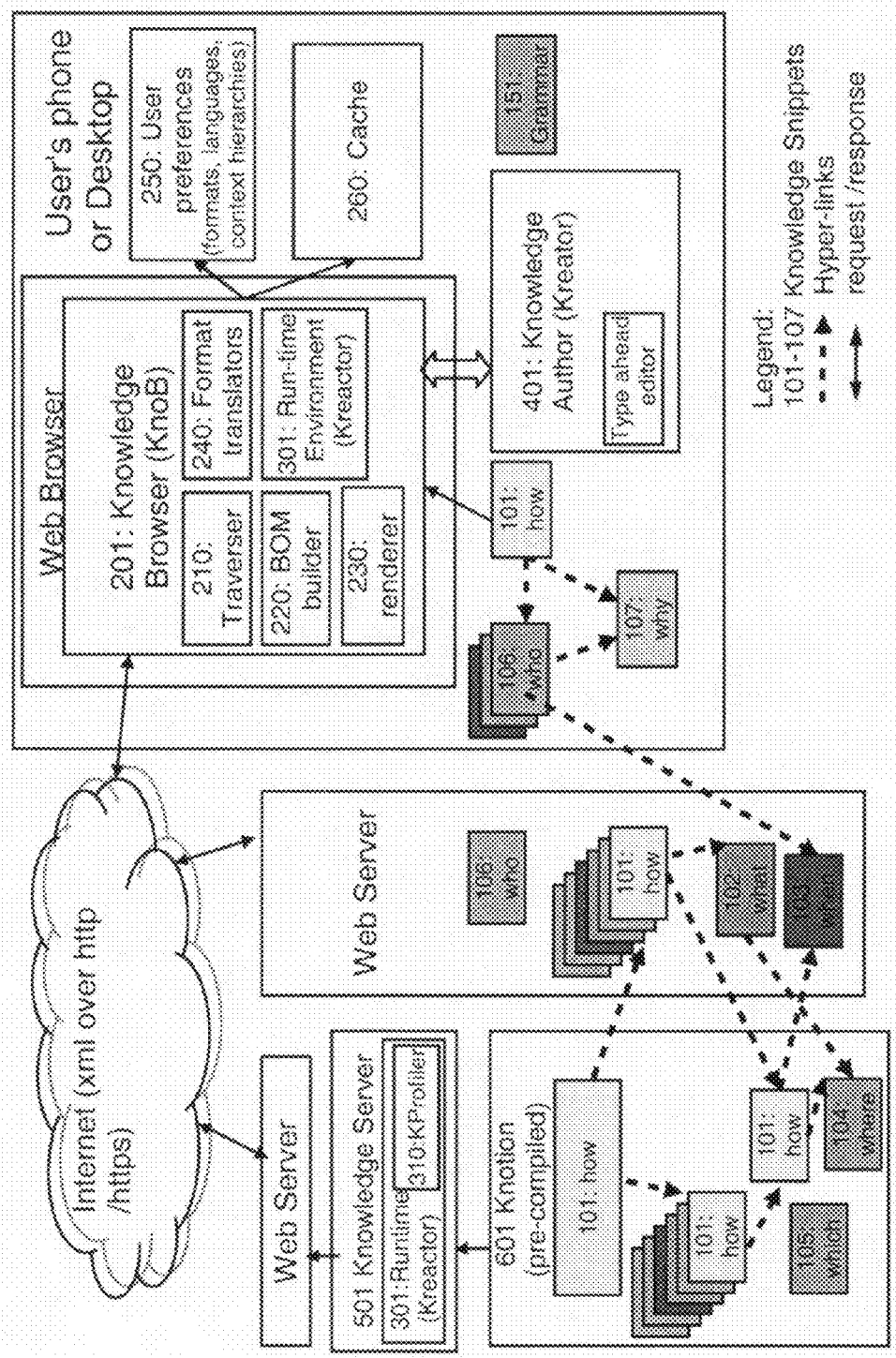
FIG. 1A: A diagram depicting the Overview of the Knowledge Representation approach with supporting tools for an alternate embodiment

FIG. 1A shows an alternate embodiment where the Knob 201 is deployed in a User's phone or a desktop. Given it is potentially a smaller device, some of the components are not included here; specifically the Kprofiler 310 and a format translator in the Kreator 401. But it is supported externally by a knowledge server 501 with its run time environment (Kreactor 301) and Kprofiler 310 somewhere on the web. The Knowledge server is helping to process the pre-compiled Knotion 601 that was deployed on it. This could have been an enterprise deployment scenario where the Knotion represents the enterprise business process and the user is now trying to process that using their phones or desktops.

While the attached listings demonstrate how such a browser can be built using xsl, the same can also be built using a variety of other languages such as Java, C# etc and deployed as a stand alone desktop application or a web browser plug-in. Other embodiments include having part of the browsing functionality such as traversal, aggregation deployed on a server to make the client even lighter. An alternate embodiment is to eventually build the supporting tools using the representation form (near natural language) proposed in this invention itself.

While the above descriptions contains many specificities, these should not be construed as limitations on the scope of the invention, but as exemplifications of the presently preferred embodiments thereof. Many other ramifications and variations are possible within the teachings of the invention. Some examples are provided above. Thus the scope of the invention should be determined by the appended claims and their legal equivalents, and not constrained by the examples given. All references cited herein are hereby incorporated by references.

CONCLUSIONS AND RAMIFICATIONS

Accordingly the reader will see that, this invention has far reaching ramifications to how we document anything and how software is built and deployed. It shakes up the software development and knowledge representation paradigms. (see FIG. 2). The process flow is documented first using the authoring system in the representation format defined in this invention. This displays the inputs needed at each layer of the snippet and identifies any unassigned entities (which are analogous to variables in a programming language).

Depending on the mode of the authoring tool this knowledge can be executed interactively or a web service can be generated including the collection of the condition's, inputs and outputs for inter operating with existing legacy systems. Using the data summary generated by the system, the data designers then design the persistence map, which could for example be a relational database. The invention proposes to have persistence adapters to define this deployment option.

The usability engineers then use the information provided by the supporting tools i.e. "What data is needed at which point in the process flow?". They then customize the auto-generated screens, and indicate which additional context data is to be displayed on those screens.

This is then packaged and signed for deployment in the enterprise context. This ensures that the business staff can fully understand what goes into a software application and minimizes the translation by middle layers of programmers, analysts and designers.

In short this invention will provide the biggest advance in documentation of structured knowledge and automating the software development process.

Specifically to Summarize:

Any program (knowledge snippet) can inter-operate with any other program (knowledge snippet) subject to security (having the keys). This enables knowledge snippets doing entirely different things (in different domains) to be combined at run time, in currently unimaginable ways, to sequence new activities.

This also means that any program (.how) can access any data (.what), again subject to security permissions, which enables creation of a "seamless world wide ocean of structured knowledge".

Documentation and code are the same which means they never get out of sync.

Even though the business person is "programming" in a near natural language, it is made very easy. It provides a structure for them to understand/define everything clearly by binding each of their words/phrases to a knowledge snippet. Otherwise the Kreator automatically and immediately points out the unbound (undefined) items. This greatly reduces the ambiguity inherent in the requirements process of today, where it is left to the designers and programmers to either decide later in the life cycle or go back to the business when they start uncovering these ambiguities.

Searching the web becomes a lot easier and accurate with current search technology because the information is already structured.

Knowledge in different languages can be combined to produce aggregate results which could be made available in an entirely different language. For example a recipe which has a part in Italian and another part in French can be combined and made available in Telugu.

Web pages can be annotated with the structure mentioned in this invention to easily convert them to knowledge that can be processed and combined.

Impact analysis of changing anything becomes easy as it just involves an inward and outbound link analysis into the corresponding knowledge snippet.

As a by product this invention will also solve the problem of finding enough quality programmers to feed the world's application programming needs, by minimizing that need.

While this approach might not completely make the open source movement a moot point, because even if all the knowledge represented this way is human readable, in one of the embodiments it could still be classified as confidential by encrypting and signing but the keys not shared for everybody to look at the documentation ("source").

Fortunately this approach is not mutually exclusive with the current programming approaches or standards. It is possible to have this approach co-exist with the existing software, with native interfaces. Adapters and connectors can help migrate the knowledge represented in various industry formats to this common representation format. The migration path which also validates this approach is to use this new approach as a layer over web services and other current integration mechanisms. As the usage matures, those business services themselves can be further broken down into knowledge snippets to eventually have everything expressed in knowledge snippets. But this won't happen overnight and could take years. And this might not completely replace current programming languages and CASE tools. Just as the current programming languages con exist with machine/assembly languages today, where the low level languages are used for few specialized tasks, I see the current programming languages still being used for building few infrastructure components in the future. However the goal is to provide this invention as a replacement to most of the business application programming. There will however remain a very small class of problems that are best served by "high level languages" like Java, C# etc and yet a smaller class of problems that are still best served only by assembly languages.

EXAMPLES

Representation Example

One of the many ways "Mary had a little lamb" could be marked up is as follows:

"Mary" hyper-linked to "Mary.who.xml" which answers who is the Mary in this context, "had" hyper-linked to "had.how.xml" which answers how she "had"? alternatively "had" could also point directly to possess.how.xml Or eat.how.xml depending upon the context.

"a little lamb" hyper-linked to "a_little_lamb.what.xml" which answers what is meant by a little Iamb. In another context, each of the words in the fragment "a little lamb" might have pointed to a different snippet.

In this example there could have been multiple meanings to that sentence, but these hyper-links enables the author to point his/her communication to the correct unambiguous interpretations to each of these words or phrases.

Example 1

Pizza and Dinner

To begin with, a simple example is presented which explains the operation that relates to combining recipes. This example includes the following knowledge snippet's (which are on the attached CD).

Make_pizza.how.xml: which describes how to make a pizza. It also refers to two child knowledge snippets i.e PanningthePizzaDough.how.xml and pizzasauce.how.xml.

Make_Aspagarus_soup.how.xml: which describes how to make Aspagarus Soup. It further refers to a child knowledge snippet i.e Basicvegetablestock.how.xml.

The preferred embodiment of the representation format described above in FIG. 1 is in these files. The browser part is embodied in the files how.xsl, what.xsl, which.xsl, which are used to aggregate these knowledge snippet's and present the combined views. When any of these knowledge snippet files (ending in how.xml) are opened using a web browser such as Internet Explorer™ or Mozilla Firefox™, the view that is seen by the user is the composite view combining the parent snippet with that of the children. For example in the case of Make_pizza, the inputs view shows all the ingredients required not only by Make_pizza but also for PanningthePizzaDough.

The power of this concept becomes evident by looking at Mydinner.how.xml (FIG. 3) which is created by quickly combining the two recipes just by mentioning the two (Make_pizza and Make_Aspagarus_soup) as tasks with their URLs. Now the user can see the tasks (FIG. 4) or ingredients of all these recipes and sub parts in one shopping list. (FIG. 5) Or if the user desires to see the ingredients or tools of just the sub parts they can drill down to that level. In an alternate embodiment the list can be integrated by sorting, removing duplicates and adding up the ingredients where quantities are mentioned.

Example 1A

Simple Snippet with a Decision

Real life is not that simple and straight forward. We face decisions all the time.

Makepizzabuythebase.how.xml (on the CD) is an example where the user can decide if (s)he wants to buy the pizza base or not. This is implemented using a <if><condition><then> <else> block.

Example 2

Knowledge Browser (Knob)—Expressed in this Format Itself

Figure 6:
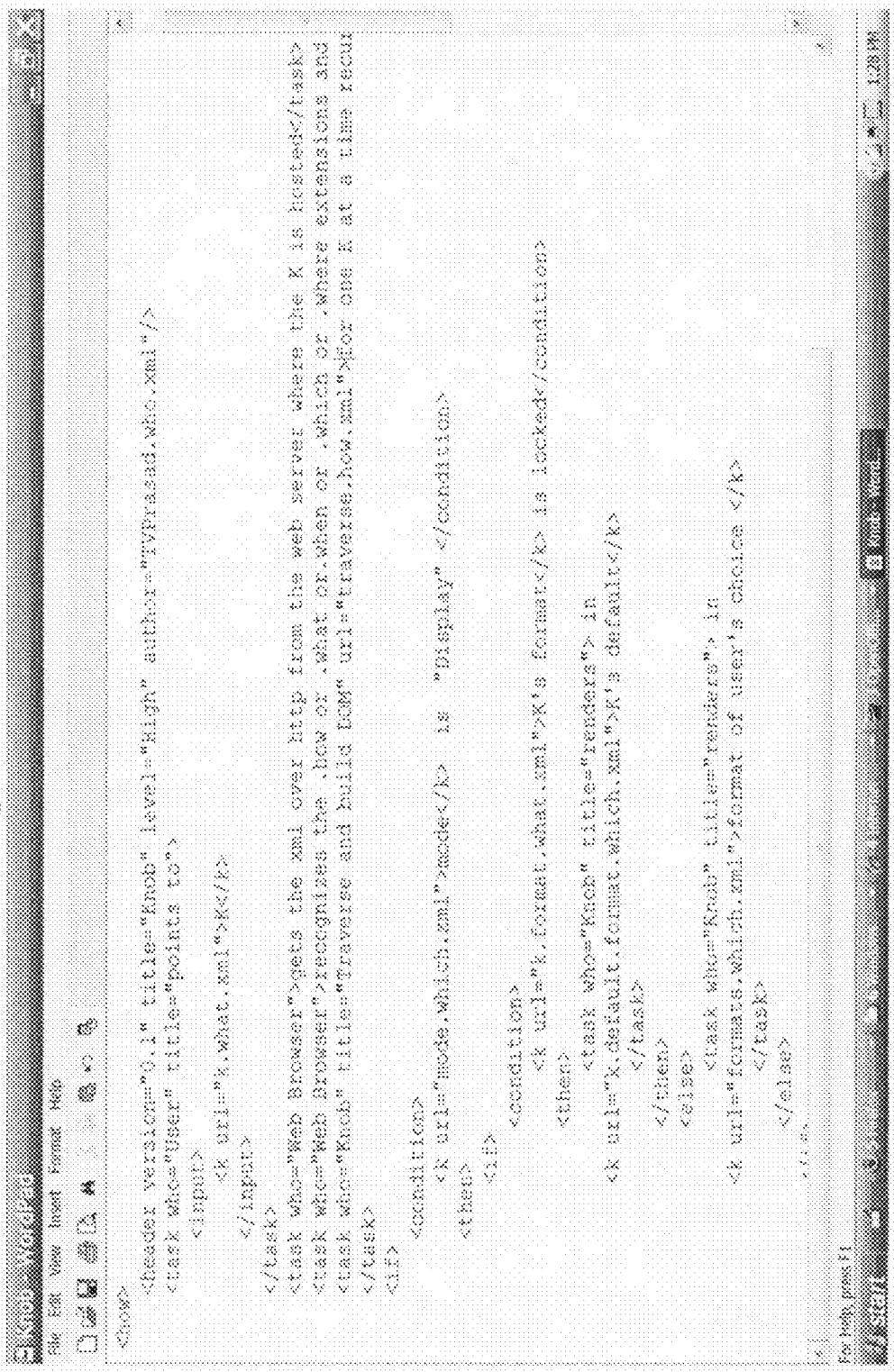
FIG. 6: Screen shot of Knob description in the proposed language (Also on CD as Knob.how.xml)
Figure 7:
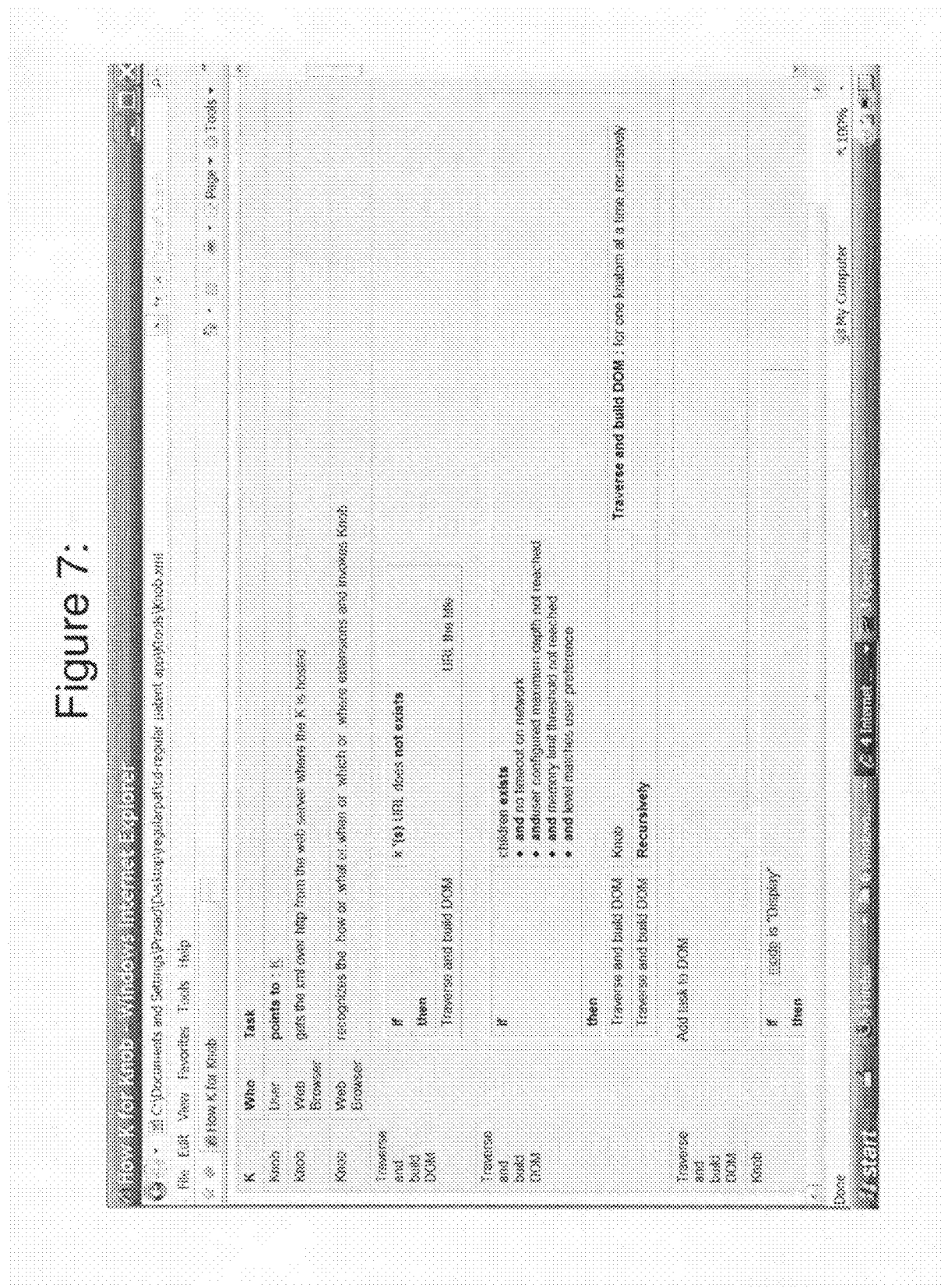
FIG. 7: Screen shot of the swimlane view rendering of the knowledge snippet (Knob.how.xml) from FIG. 6.
Figure 8:
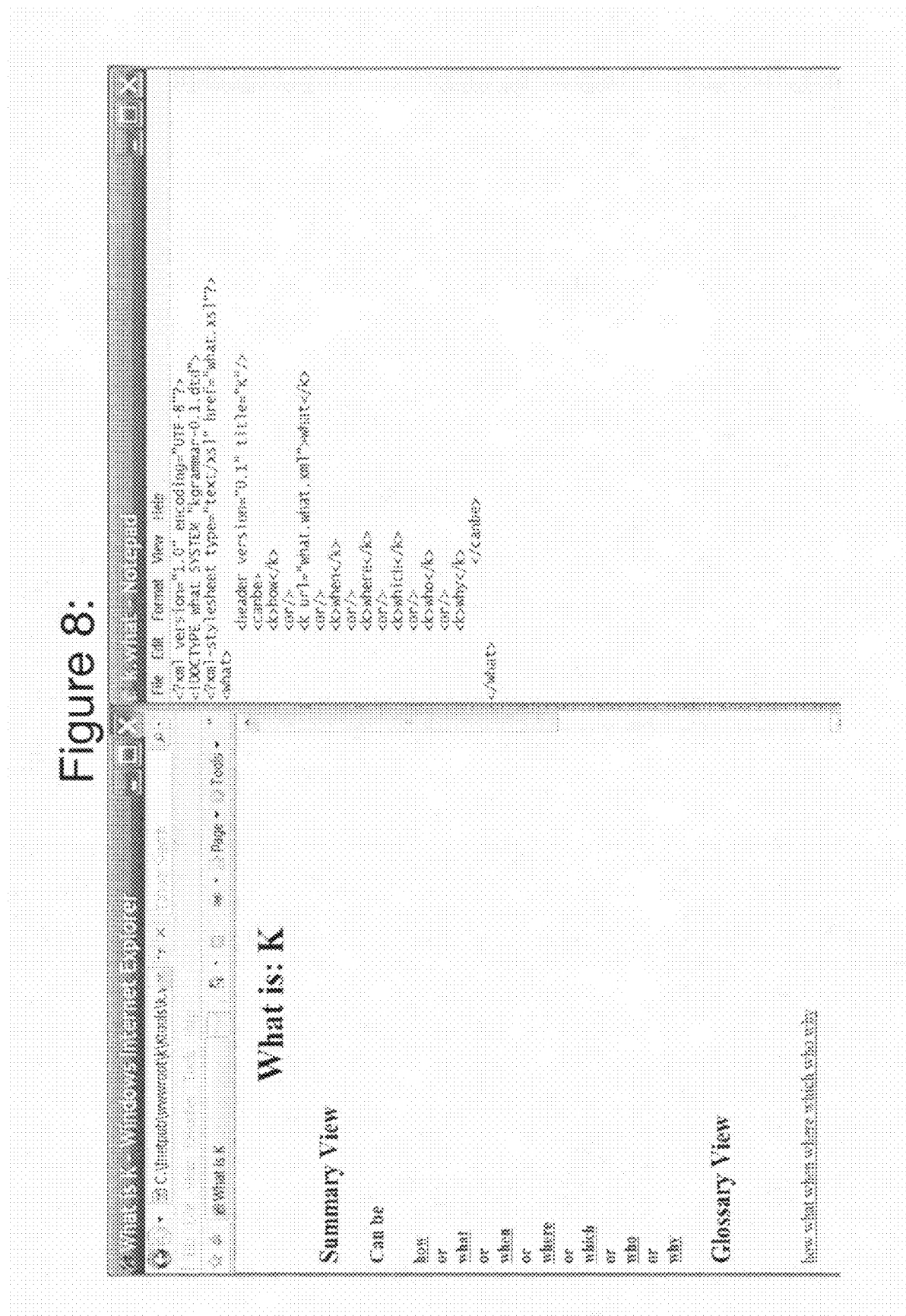
FIG. 8: "Knowledge Snippet" (K) defined in this representation format.

The snippet in (FIG. 6) describes at a high level how the Knob part of this invention works. Note that this is the internal representation which is using near natural language communication constructs. An easy to read view of the same knowledge snippet as rendered by the Knob is in FIG. 7. Notice how FIG. 7 shows embedded child knowledge snippet (Traverse and Build DOM) as well.

Figure 4:
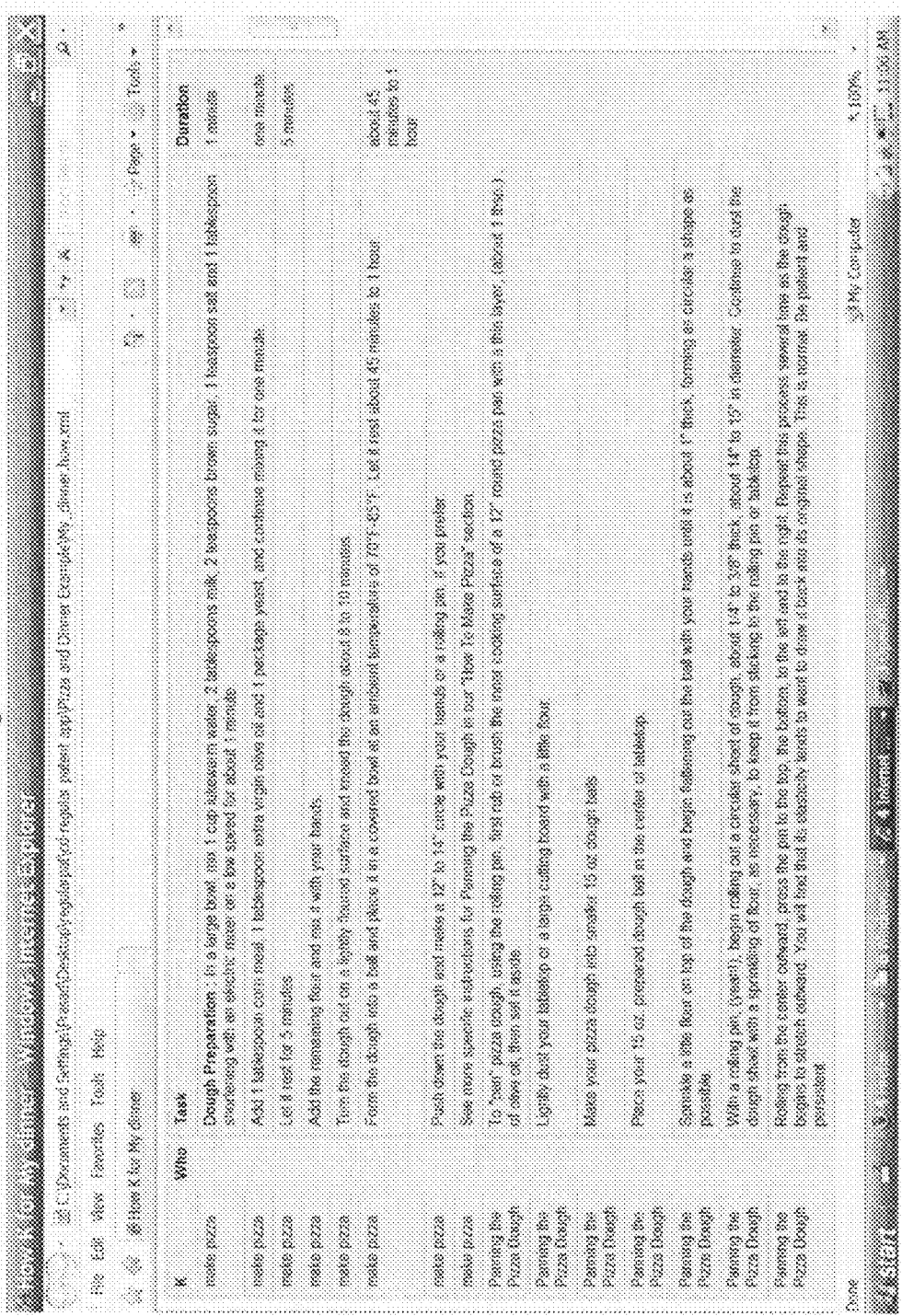
FIG. 4: Screen shot of Swimlane View in Knob aggregated for My_dinner knowledge snippet from FIG. 3

The snippet in FIG. 4 explains in a near natural language how the Knob operates at a high level, as well as provides an example of the proposed representation language. Any of the items enclosed in a <k> </k> tag are references to child knowledge snippets and by default associate with the snippet file of the same name and with the appropriate extension derived from the context. For example where the <k> tag lacks a URL it is automatically constructed by using the name in the tag and appending it with either a .how or .when depending on the context of the tag in which knowledge snippet is embedded. This keeps the snippet very readable and easy to create.

The Knob comes with a set of pre-configured output formats (preferences can be set by the user) which are the defaults for certain knowledge snippet types. These formats are specified in terms of XSLs. Others can be added by the user with the Authoring tool (or modify the XSLs to their preference) However the formats can also be forced by the content creator (typically in an enterprise roll out situation if signed knowledge snippets are used) by specifying the exact XSL to be used. The hierarchy of the formats used will be as follows:

For a signed knowledge snippet, the XSL will be resolved only to the one specified in the knowledge snippet, This is to let enterprise/packaged application deployment staff complete control over the look and feel of their applications. Only if the knowledge snippet does not point to an XSL, will the user preference be used.

For unsigned knowledge snippets, the XSL will be resolved to one of the following in a user specified order 1. the one mentioned in the knowledge snippet, 2. the user preferences.

In both the above cases the format of the knowledge snippet that is being displayed has the precedence over its children knowledge snippets.

Given below are examples of how Kreator can be used in different scenarios.

Example 3

Personal Knowledge Assistant (Fax Tax Papers)

Consider this example where the user starts typing "Fax tax papers to John" as a new knowledge snippet. The relevant diagram is FIG. 1A. Here is the operation:

The user enters the command mode which indicates to the Kreator 401 to create a new knowledge snippet of the type "how" as it relates to an activity.

As the user is typing in each character, there is a floating drop down of known knowledge snippet's that match those starting characters. The dropdown is displayed from the Knob's cache of that user, so the user can use the autocomplete feature to select one of those. If none were found or were suitable, once the user is done typing the first word "Fax", (delimited by the space), the Kreator 401 searches the (a) Knob cache, (b) web browser cache, (c) the index of local disk (d) the user's preferred search space, which could be the combination of the systems on their home or work networks as the case may be and finally (e) a preferred web search engine (eg. Google, or Yahoo or other based on the user's preference) in that order to find any occurrences of a knowledge snippet file starting with those letters.

An updated drop down is presented to the user with all such occurrences of the knowledge snippets. In this example, let us assume a fax knowledge snippet is supplied by the manufacturer of the fax machine and it was found at one of these places. The user would then choose that knowledge snippet. That triggers the Kreator 401 to run the same analysis as the browser on the knowledge snippet to find out that this knowledge snippet needs two required inputs, namely a document (or a set of one or more pages) and a fax number. Now the Kreator 401 has a context of what to expect next. This is generally true of "How" knowledge snippet's because most action commands begin with a verb and the knowledge snippet of that verb can indicate which further inputs are needed.

When the next two words are being typed, again there could be a match of the document that the user might have saved as "tax returns 2005.pdf". In this case there might be a drop down showing tax returns 2005, tax returns 2004, tax returns 2003 etc. Since the context of the input is already known, the Kreator knows that the user might want to send more than one document, it will allow the user to select more than one. Let us say the user chose two of these documents (2005 and 2004)

Even if the user saved the document with a different name eg. "Uncle Sams share.pdf", it might still show up during the keyword search of the local drive.

Finally when the user starts typing alphabets "John" instead of a number (for fax), the system will search for John.who from the cache to help the user eventually figure out the right knowledge snippet which has a fax number.

The user can then save the knowledge snippet or click the button which says run now.

Then the system confirms with the user saying "Fax "tax returns2005.pdf", "tax returns2004.pdf" to John (fax 123-456-7890) now? The two documents are the ones chosen earlier. The options given to the user are Yes/Schedule it/Save knowledge snippet for later.

If the user chooses Yes, the fax is sent right then. This happens in the manner indicated in the Fax.how knowledge snippet that was supplied from the manufacturer with the inputs being the two documents mentioned above and John's fax number.

If the user chooses Schedule it, a prompt appears for when? Depending upon the UI guidelines of the author and preferences for the user (in this case both are same), the prompt could have accept a text input or a digital clock/calendar icon, which can be used to visually set the time for sending the fax.

And finally the user could choose to Save the knowledge snippet for later use.

One of the ramifications of this example is in harnessing this technology in mobile phones in conjunction with available Speech recognition and text to speech. This would enable the user to accomplish this task from anywhere with their mobile phone. This is how I see a true convergence of knowledge where anybody can use the knowledge available anywhere to accomplish their need from anywhere.

Example 4

Google Search

Google had released an API for integrating its search capability into other applications. It made its offering available as a wsdl file for systems and a reference document for humans. I greatly admire Google and its work and this is not a knock at Google, but at the current limitation of the technology. That is these two artifacts could get out of sync for a variety of reasons. Neither one gives the complete picture by itself. For example the wsdl and xml schemas do not state which parameters are optional and which ones are not. So the following example illustrates how this representation format can solve that problem.

The file doGoogleSearch.how on the CD is a "how" knowledge snippet which partially wraps the web service published by Google. It is an example of how this technology can wrap existing software to provide better clarity on what they do.

The use case here is as follows.

The user would select the convert wsdl wizard option in the Kreator 401. This would then process the wsdl and generate a how knowledge snippet for each operation and a what knowledge snippet for each complex, simple xsd elements and messages. A sample xsl file called showwsdl.xsl on the CD shows how any wsdl will be mapped to hows and whats. Once those mappings are confirmed by the user, the Kreator 401 goes ahead and creates those knowledge snippets. Then the user can open up each of those knowledge snippets individually and annotate/modify those knowledge snippets with near natural language descriptions, add information to specify which input parameters are optional etc. This obviates a need for a separate reference document that could possibly get out of sync.

Now the services in this wsdl are available to be dynamically integrated with any other knowledge snippet. The search knowledge snippet in this example has instructions in it as to how to get the key if it does not already exists in the user's context, (as pointed from the user's context knowledge snippet). This is an improvement from the existing technology where the wsdl does not have any special instructions on the inputs.

Example 5

Incomplete, Ambiguous or Difficult Questions

Sometimes there are tasks that the author of the knowledge snippets might put in as a place holder, hoping to replace it later with an appropriate knowledge snippet. Other times there are tasks that are plain simple for humans, but difficult for systems. For example an author is writing a knowledge snippet to do "something". Let us say, one of the next steps in that process was based on the answer to a question "Is the sky cloudy now?". The way this is represented is as follows in the file named "something.how.xml".

<how>

<header version="0.1" title="Something" author="someauthor.who.xml" level="High"/>

<task url="first_task_is_to_do_the_first_part_of_something.how.xml"> the first task is to do the first part of something</task>

. . .

<if> <condition>Is the sky cloudy now?<condition>

<then> <task> the cloudy task</task> </then>

<else> <task> the sunny task</task> </else>

</if>

When this something.how.xml is pointed to in the Knowledge Browser (Knob), and the user selects "Interpret mode", the run time environment (Kreactor) is invoked with this something.how.xml. Let us say all the other parts of this knowledge snippet have been bound to other knowledge snippets unambiguously and could be executed.

When the control comes to this condition evaluation, the Kreactor will notice that the condition has natural language text that is not bound to any knowledge snippets. It also knows that this is a decision construct, i.e an if tag. So it shows the text in the condition tag (in this case "Is the sky cloudy now?") with a choice of Yes or No. The next step is determined based on the user's answer at this point. While such questions might be answered with lot of instrumentation or high tech gadgetry, it might just be plain simple to ask the user at run time.

If the generate web service or compile options were selected, the code will be generated with this user interaction in it. Notice how this helps end-users to incrementally and iteratively program (and run) computers to automate what they know to that point. Also notice that the last two task tags do not have a URL nor a title. This acheives two purposes, one is to keep the snippet simple and readable. The second purpose is to avoid repetitive information both in the URL and the text. In those cases, the browser system points those tasks by default to "the_cloudy_task.how.xml" and "the_sunny_task.how.xml" using the convention of using_(underscore) for spaces to determine file names and using the how.xml suffix since the context is a "task" which should be a "how" snippet.

APPENDIX

Attached to this application is a CD ROM (in duplicate i.e two identical copies) which contains working examples of some embodiment of some of the features mentioned herein. Note that most examples use the term K for "Knowledge snippets".

1. Knowledge representation format: An example grammar for the preferred embodinvent of the format is given in the file kgrammar-0.1.dtd on the attached CD. The knowledge snippet's can be authored using any text editor or the Kreator Authoring tool that is part of this invention.

2. Knob (Browser): An embodiment of the Browser is written in XSL which is on the attached CD. The files are the ones ending with *.xsl extension and are to be applied to the knowledge snippets. This way a regular web browser can display the results. These have been tested with Internet Explorer v6.0.2900.2180.

The root directory of the CD has the following files:

Prasad Patent application.doc (this application)

pat.odg (drawings in open office format)

Literate Programming—Software Aging.htm (reference)

Ref_Model_10_years_on_Hollingsworth.pdf (reference)

Ktools directory contains the grammar dtds, knob examples and xsl files for the browser (example 2 and FIGS. 6-10).

Figure 3:
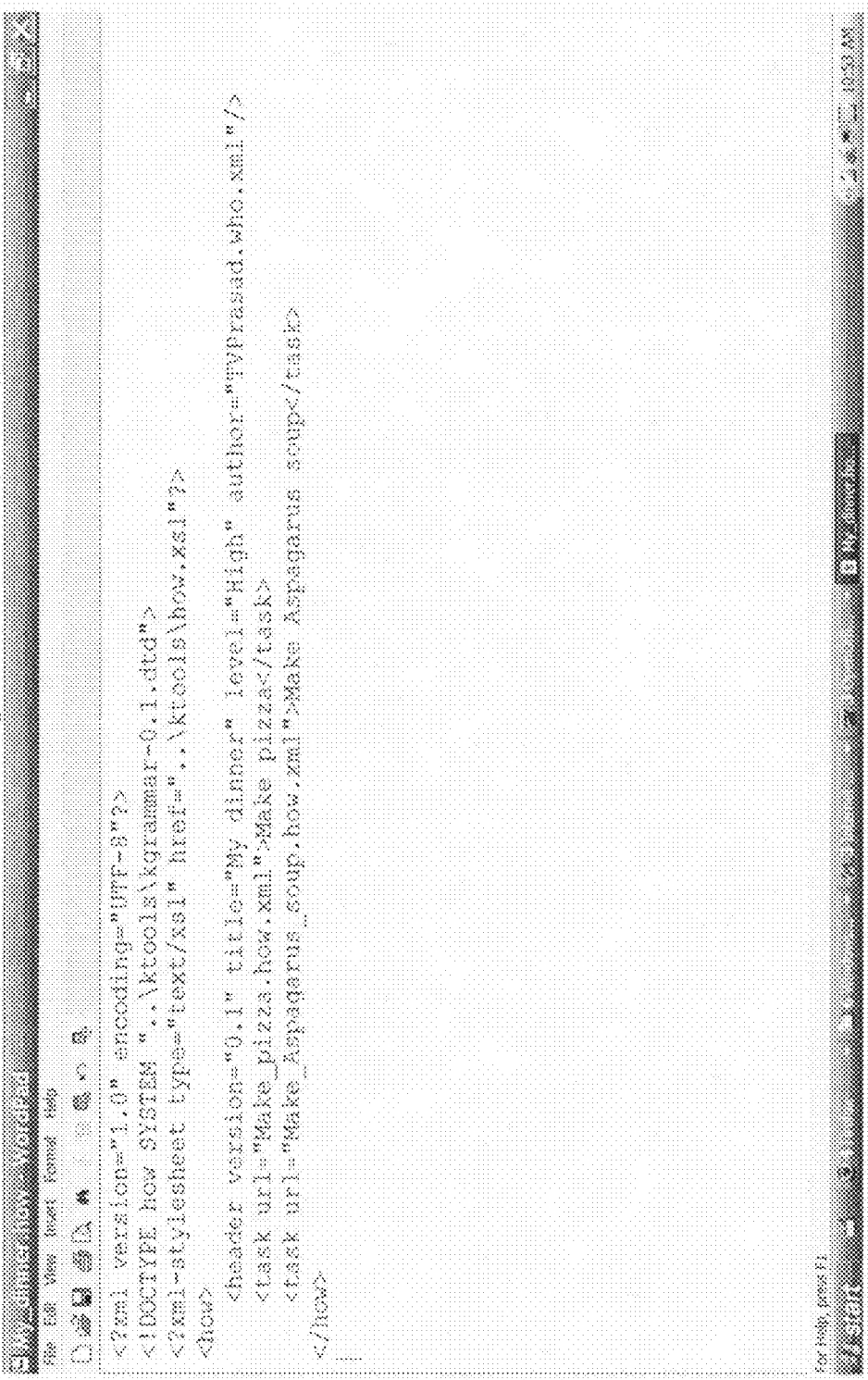
FIG. 3: Screen shot of an aggregator knowledge snippet which combines the knowledge from other child knowledge snippets
Figure 5:
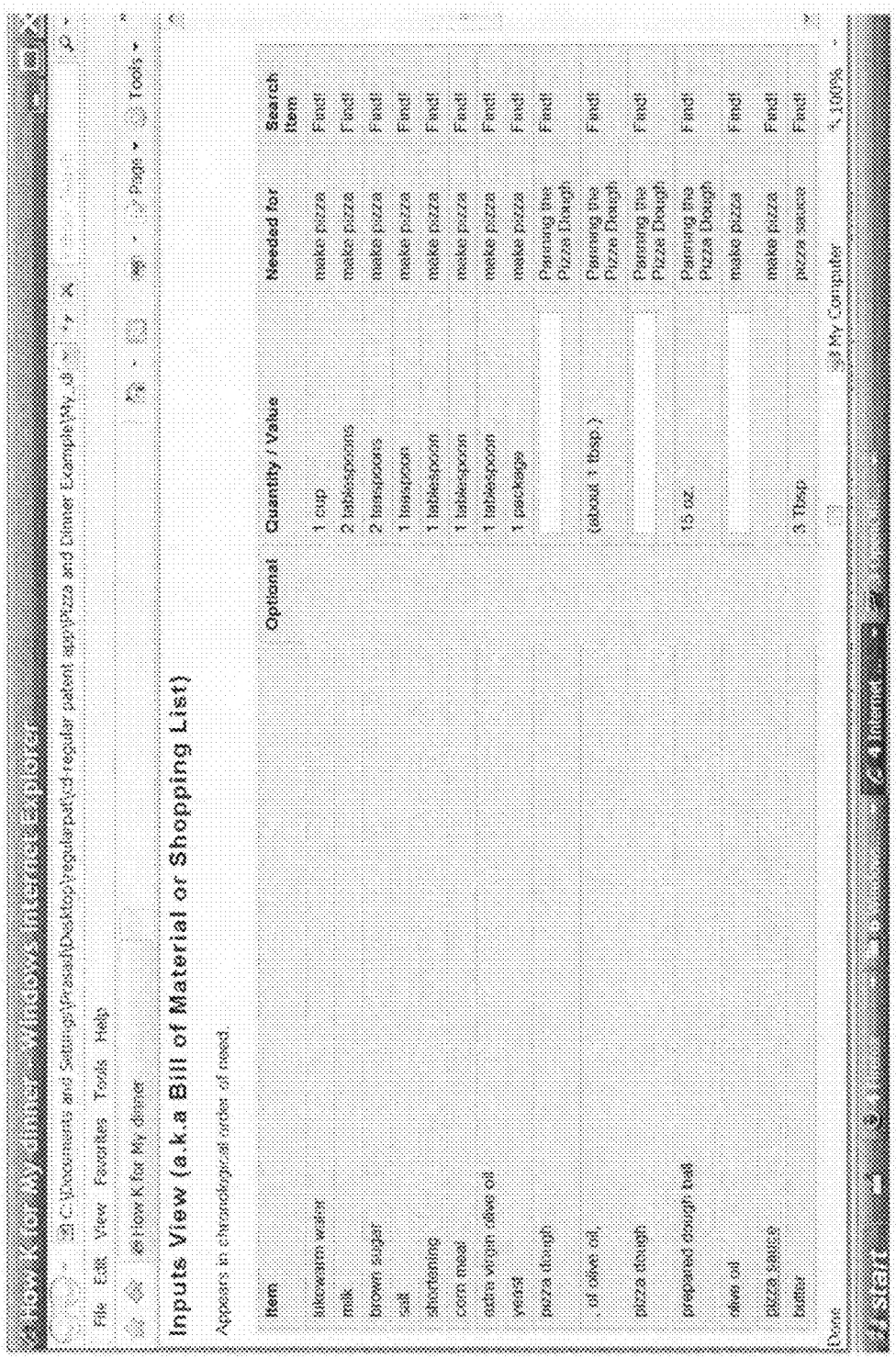
FIG. 5: Screen shot of Inputs View in Knob aggregated for My_dinner knowledge snippet from FIG. 3

The directory "Pizza and Dinner Example" provides the files in examples 1 and 1A and FIGS. 3,4 and 5.

The directory "wsdl example (Google)" provides the files for example 4.

The directory "Lending Example" provides some more examples in a business application scenario.

I claim:

1. A computer-implemented method for organizing and processing knowledge in a computer-readable, near-natural language, comprising:
   (a) maintaining a collection of knowledge snippet files according to a nomenclature in which each of the knowledge snippet files has a name relating to a particular interrogatory and the type of the interrogatory and content in a near-natural language comprising an answer to the interrogatory, at least one of the knowledge snippet files including a link to another of the knowledge snippet files;
   (b) selecting one of the knowledge snippet files;
   (c) storing in memory content of the selected knowledge snippet file; and
   (d) storing in memory content of at least one other knowledge snippet file linked from the selected knowledge snippet file;
   (e) dynamically consolidating inputs and outputs of different "how"-type knowledge snippet files, the "how"-type knowledge snippet files sequenced by a user into a new parent knowledge snippet file which is presented to the user with net inputs and outputs after the consolidating and de-duplicating intermediate inputs and outputs from each of child "how"-type knowledge snippet files.

2. The method of claim 1, further comprising presenting user-desired knowledge from a particular perspective, using at least part of the stored content; wherein steps (c) and (d) are performed based at least in part on parsing the content of the selected knowledge snippet file and resolution, by user input, of one or more parsed token contained in a meta tag.

3. The method of claim 1, further comprising executing the selected knowledge snippet file, wherein the selected knowledge snippet file relates to a "how" type of interrogatory.

* * * * *